US011292337B2

United States Patent
Pifer et al.

(10) Patent No.: US 11,292,337 B2
(45) Date of Patent: Apr. 5, 2022

(54) EVAPORATIVE EMISSIONS FUEL TANK VENTING SYSTEM WITH DRAIN PUMP

(71) Applicant: Eaton Intelligent Power Limited, Dublin (IE)

(72) Inventors: Daniel L. Pifer, Chelsea, MI (US); Robert A. Dayton, Attica, MI (US)

(73) Assignee: Eaton Intelligent Power Limited, Dublin (IE)

( * ) Notice: Subject to any disclaimer, the term of this patent is extended or adjusted under 35 U.S.C. 154(b) by 38 days.

(21) Appl. No.: 17/003,447

(22) Filed: Aug. 26, 2020

(65) Prior Publication Data

US 2020/0391585 A1    Dec. 17, 2020

Related U.S. Application Data

(63) Continuation-in-part of application No. PCT/EP2019/025051, filed on Feb. 21, 2019.

(Continued)

(51) Int. Cl.
*B60K 15/00*    (2006.01)
*B60K 15/035*    (2006.01)
(Continued)

(52) U.S. Cl.
CPC ... *B60K 15/03504* (2013.01); *F02M 25/0836* (2013.01); *B60K 2015/03296* (2013.01);
(Continued)

(58) Field of Classification Search
CPC .... B60K 15/03504; B60K 2015/03296; B60K 2015/03514; B60K 2015/03523; B60K 2015/03566; F02M 25/0836
See application file for complete search history.

(56) References Cited

U.S. PATENT DOCUMENTS

2012/0012599 A1*   1/2012   Graham ........... B60K 15/03519
                                                          220/745
2017/0328311 A1*  11/2017   Franklin ............. F16K 11/0836
(Continued)

FOREIGN PATENT DOCUMENTS

WO    2016049320 A1    3/2016
WO    2017214584 A1    12/2017
(Continued)

OTHER PUBLICATIONS

International Search Report and Written Opinion for International Application No. PCT/EP2019/025051 dated Jun. 21, 2019.

*Primary Examiner* — Sizo B Vilakazi
*Assistant Examiner* — Sherman D Manley
(74) *Attorney, Agent, or Firm* — RMCK Law Group PLC

(57) ABSTRACT

A vent shut-off assembly configured to manage venting on a fuel tank configured to deliver fuel to an internal combustion engine includes a first liquid vapor discriminator (LVD), a main housing, a poppet valve assembly, a pump and an actuator assembly. The first LVD is disposed in the fuel tank. The main housing selectively vents to a carbon canister. The poppet valve assembly has a poppet valve arranged in the main housing. The pump selectively pumps liquid fuel from the main housing. The actuator assembly is at least partially housed in the main housing and includes a cam assembly having a cam shaft that includes a first cam and a second cam. The first cam has a profile that one of opens and closes a poppet valve fluidly coupled to the first LVD. The second cam has a profile that actuates the pump.

20 Claims, 18 Drawing Sheets

Related U.S. Application Data

(60) Provisional application No. 62/635,884, filed on Feb. 27, 2018.

(51) Int. Cl.
    *F02M 25/08*     (2006.01)
    *B60K 15/03*     (2006.01)

(52) U.S. Cl.
    CPC ............ *B60K 2015/03514* (2013.01); *B60K 2015/03523* (2013.01); *B60K 2015/03566* (2013.01); *B60K 2015/03585* (2013.01)

(56) References Cited

U.S. PATENT DOCUMENTS

| | | | |
|---|---|---|---|
| 2018/0029468 A1* | 2/2018 | Mills | B60K 15/03519 |
| 2018/0087475 A1* | 3/2018 | Mills | B60K 15/03519 |
| 2019/0040821 A1* | 2/2019 | Ishihara | F02M 25/0836 |
| 2019/0105984 A1* | 4/2019 | Mills | F02M 25/089 |
| 2019/0353121 A1* | 11/2019 | Mills | F02M 25/0836 |
| 2020/0398661 A1* | 12/2020 | Mills | B60K 15/03519 |

FOREIGN PATENT DOCUMENTS

| | | |
|---|---|---|
| WO | 2018013781 A1 | 1/2018 |
| WO | 2018013785 A2 | 1/2018 |

\* cited by examiner

| Normal Operation | Poppet Position | Cam Lobe Position |
|---|---|---|
| | Full Open | High |
| | Vapor Venting To Canister | |

| Normal Operation | Poppet Position | Cam Lobe Position |
|---|---|---|
| | Full Closed | Low |
| | No Vapor Venting To Canister | |

| OPR Open | Poppet Position | Cam Lobe Position |
|---|---|---|
| | Close | Low |
| | Vapor Venting To Canister | |

EVAPORATIVE EMISSIONS FUEL TANK VENTING SYSTEM WITH DRAIN PUMP

CROSS REFERENCE TO RELATED APPLICATION

This application is a continuation of International Application No. PCT/EP2019/025051 filed Feb. 21, 2019, which claims the benefit of U.S. Provisional Application No. 62/635,884 filed Feb. 27, 2018, the contents of which are incorporated herein by reference thereto.

FIELD

The present disclosure relates generally to fuel tanks on passenger vehicles and more particularly to a fuel tank having an electronically controlled module that manages the complete evaporative system for the vehicle, the fuel tank venting system having a cam operated venting system and over pressure relief.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle. In fuel tanks configured for use with a hybrid powertrain it is also necessary to properly vent the fuel tank. Such fuel tanks need to account for high pressures and can incorporate an over pressure relief (OPR) and over vacuum relief (OVR). Moreover, it may also be necessary to provide a means for OVR in a conventional gasoline fuel tank system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vent shut-off assembly configured to manage venting on a fuel tank configured to deliver fuel to an internal combustion engine includes a first liquid vapor discriminator (LVD), a main housing, a poppet valve assembly, a pump and an actuator assembly. The first LVD is disposed in the fuel tank. The main housing selectively vents to a carbon canister. The poppet valve assembly has a poppet valve arranged in the main housing. The pump selectively pumps liquid fuel from the main housing. The actuator assembly is at least partially housed in the main housing and includes a cam assembly having a cam shaft that includes a first cam and a second cam. The first cam has a profile that one of opens and closes a poppet valve fluidly coupled to the first LVD, wherein the poppet valve is in a closed position, vapor is precluded from passing from the fuel tank to the carbon canister. When the poppet valve is in an open position, vapor is permitted from passing from the fuel tank to the carbon canister. The second cam has a profile that actuates the pump.

According to additional features, the pump can include a piston housing, a piston and a check valve. The piston can slidably translate within the housing. The check valve permits liquid fuel from exiting the vent shut-off assembly and inhibits liquid fuel from entering the vent shut-off assembly. The pump can further comprise a push pin that engages the second cam on a first end and is fixed for translation with the piston on a second end. The piston housing can define a window that allows liquid fuel to enter the piston housing. A snap ring can engage the push pin at an annular recess defined around the push pin. The snap ring precludes relative translation of the push pin and the piston. The window can allow access to the annular recess of the push pin during coupling of the snap ring to the push pin.

In other features, a second LVD is disposed in the fuel tank. A first vapor tube can be fluidly connected between the first LVD and the main housing. A second vapor tube can be fluidly connected between the second LVD and the main housing. The main housing can include a vent line port. The first and second vapor tubes can be fluidly coupled to the vent line port. The first and second vapor tubes can merge at a union. The main housing can include a canister line port that is fluidly connected to the carbon canister. The actuator assembly can further include a motor that selectively rotates the cam assembly based on operating conditions. The cam assembly can further include a second cam that selectively engages a pump causing the pump to pump liquid fuel out of the main housing.

According to other features, the first cam generally includes a cam surface having a generally high lift surface and a low lift surface. The poppet valve assembly includes a poppet, a carrier that supports the poppet and a disk that supports a seal member and a pin that selectively engages the first cam. The poppet assembly further comprises a first biasing member, a second biasing member and a third biasing member. The first biasing member is biased between the poppet and the carrier. The second biasing member is biased between the disk and the retainer. The third biasing member is biased between the retainer and the collar fixed to the pin.

According to other features, the vent shut-off assembly operates during normal operations between a fully open position and a fully closed position. In the fully open position, the first cam rotates to a position wherein the high lift surface urges the pin to be depressed causing the poppet to be lifted off of sealing engagement with an inner lip seal of the seal member. In the fully closed position, the first cam rotates to a position wherein the low lift surface is aligned with the pin wherein the third biasing member urges the pin to retract away from the poppet and attains a sealing engagement with the inner lip seal of the seal member.

In other features, the vent shut-off assembly operates during an over pressure relief (OPR) event wherein pressure within the fuel tank is great enough to cause the seal member to be lifted off of a sealed position with the carrier allowing vapor to pass from the fuel tank to the carbon canister. The vent shut-off assembly can operate during an over vacuum relief (OVR) event wherein pressure within the fuel tank has dropped low enough to cause a vacuum wherein the poppet is lifted off of a sealing engagement with the inner lip seal of the seal member allowing vapor to pass into the fuel tank.

A vent shut-off assembly according to another example of the present disclosure is configured to manage venting on a fuel tank configured to deliver fuel to an internal combustion engine. The vent shut-off assembly includes a first liquid vapor discriminator (LVD), a main housing, a poppet valve assembly, a pump and an actuator assembly. The first LVD is disposed in the fuel tank. The main housing selectively vents to a carbon canister. The poppet valve assembly has a poppet valve arranged in the main housing. The pump selectively pumps liquid fuel from the main housing. The actuator assembly is at least partially housed in the main housing and includes a cam assembly having a cam shaft that includes a first cam and a second cam. The first cam actuates a poppet valve and the second cam actuates the pump.

According to other features, the first cam has a profile that one of opens and closes a poppet valve fluidly coupled to the first LVD, wherein the poppet valve is in a closed position, vapor is precluded from passing from the fuel tank to the carbon canister. When the poppet valve is in an open position, vapor is permitted from passing from the fuel tank to the carbon canister. The second cam has a profile that actuates the pump.

BRIEF DESCRIPTION OF THE DRAWINGS

The present disclosure will become more fully understood from the detailed description and the accompanying drawings, wherein.

DETAILED DESCRIPTION

Figure 1:
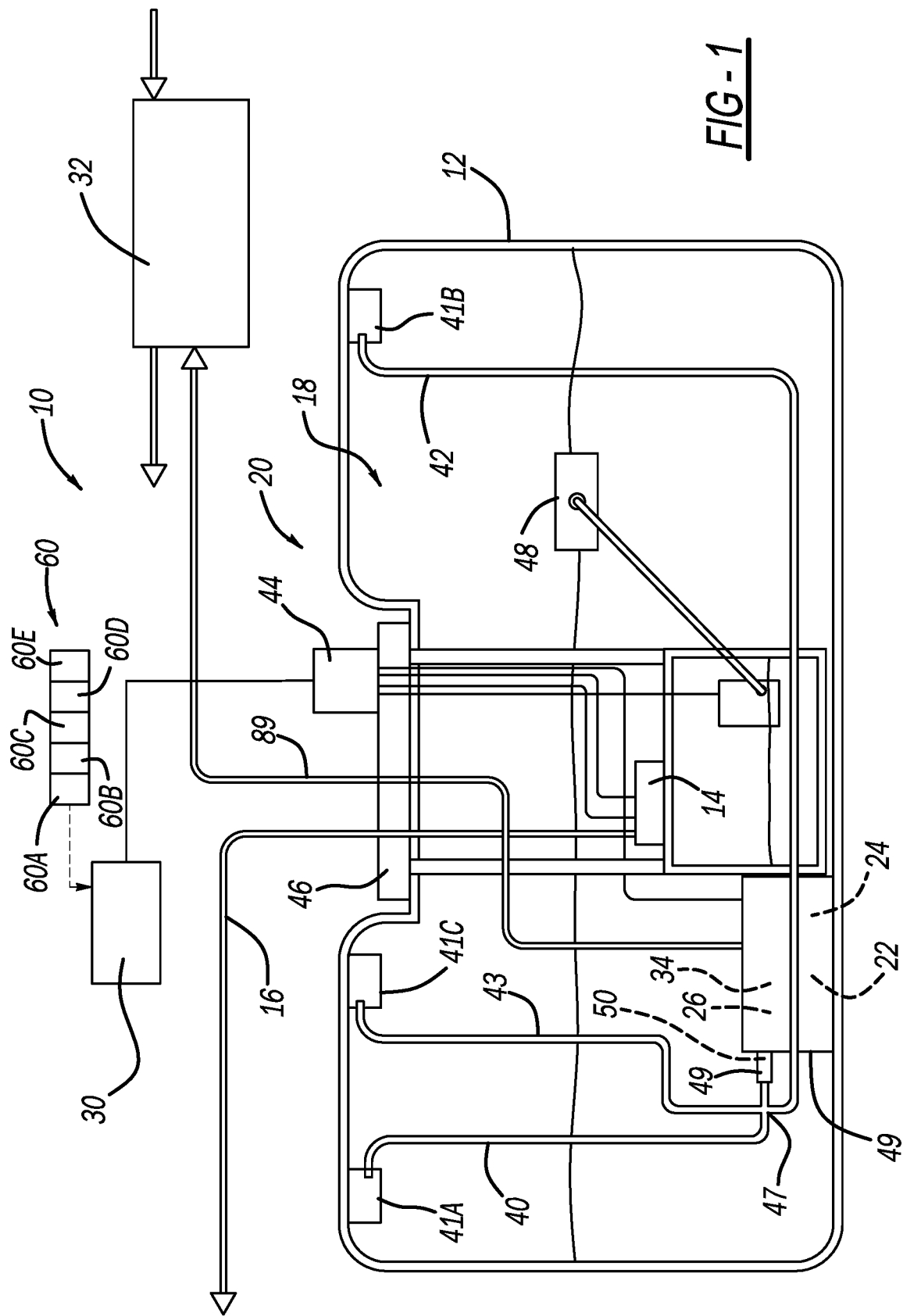
FIG. 1 is a schematic illustration of a fuel tank system having an evaporative emissions control system including a vent shut-off assembly, a controller, an electrical connector and associated wiring in accordance to one example of the present disclosure.

With initial reference to FIG. 1, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump 14. The fuel pump 14 can be configured to deliver fuel through a fuel supply line 16 to a vehicle engine. The fuel tank 12 can define a vapor dome 18 generally at an upper portion of the fuel tank 12. An evaporative emissions control system 20 can be configured to recapture and recycle the emitted fuel vapor. As will become appreciated from the following discussion, the evaporative emissions control system 20 provides an electronically controlled module that manages the complete evaporative system for a vehicle.

The evaporative control system 20 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 20 may also be compatible with pressurized systems including those associated with hybrid powertrain vehicles.

The evaporative emissions control system 20 includes a vent shut-off assembly 22, a manifold assembly 24, a liquid trap 26, a control module 30, a purge canister 32, a first vapor tube or vent line 40, a second vapor tube or vent line 42, a third vapor tube or vent line 43, an electrical connector 44, a fuel delivery module (FDM) flange 46 and a fuel fill level sensor assembly such as a float level sensor assembly 48. The first vapor tube 40 can terminate at a vent opening or liquid vapor discriminating (LVD) valve 41A arranged at a top corner of the fuel tank 12. Similarly, the second vapor tube 42 can terminate at a vent opening or LVD valve 41B arranged at a top corner of the fuel tank 12. The third vapor tube 43 can terminate at a vent opening or LVD valve 41C arranged at a top of the fuel tank 12. All of the vent openings 41A-41C can terminate at a vapor dome 18. Each of the LVD valves 41A, 41B and 41C are configured to permit vapor to pass from the vapor space 18 to the vent shut-off assembly 22 while inhibiting liquid fuel from entering and passing into the vent shut-off assembly.

In one configuration, the first, second and third vapor tubes 41, 42 and 43 can merge at a union 47. From the union 47, a vent line connection 49 connects with vent line port 50 defined on the vent shut-off assembly 22. In other examples, some or all of the vapor tubes 41, 42 and 43 can have a dedicated input port into the vent shut-off assembly 22. In one example, the manifold assembly 24 can be defined within the vent shut-off assembly 22 downstream of the vent line port 50 (or equivalent porting that accepts the respective vapor tubes 41, 42 and 43).

As will become appreciated from the following discussion, the vent shut-off assembly 22 can take many forms. In the examples discussed herein, the vent shut-off assembly 22 has an actuator assembly that is configured as a cam actuated system. However, other configurations suitable to selectively open and close vent line port 50 are contemplated including, but not limited to, other mechanical systems, solenoid systems, hydraulic systems, magnetic systems and combinations thereof.

The control module 30 can further include or receive inputs from system sensors, collectively referred to at reference 60. The system sensors 60 can include a tank pressure sensor 60A that senses a pressure of the fuel tank 12, a canister pressure sensor 60B that senses a pressure of the canister 32, a temperature sensor 60C that senses a temperature within the fuel tank 12, a tank pressure sensor 60D that senses a pressure in the fuel tank 12 and a vehicle grade sensor and or vehicle accelerometer 60E that measures a grade and/or acceleration of the vehicle. It will be appreciated that while the system sensors 60 are shown as a group, that they may be located all around the fuel tank system 10. The control module 30 can additionally include fill level signal reading processing, fuel pressure driver module functionality and be compatible for two-way communications with a vehicle electronic control module (not specifically shown).

The vent shut-off assembly 22 can be configured to control a flow of fuel vapor between the fuel tank 12 and the purge canister 32. The purge canister 32 is adapted to collect fuel vapor emitted by the fuel tank 12 and to subsequently release the fuel vapor to the engine. The control module 30 can also be configured to regulate the operation of evaporative emissions control system 20 in order to recapture and recycle the emitted fuel vapor. The float level sensor assembly 48 can provide fill level indications to the control module 30. As will become appreciated from the following discussion, the control module 30 can send signals to the vent shut-off assembly 22 based on operating conditions such as provided by the sensors 60 to open and close venting from the fuel tank 12 to the purge canister 32.

Figure 2:
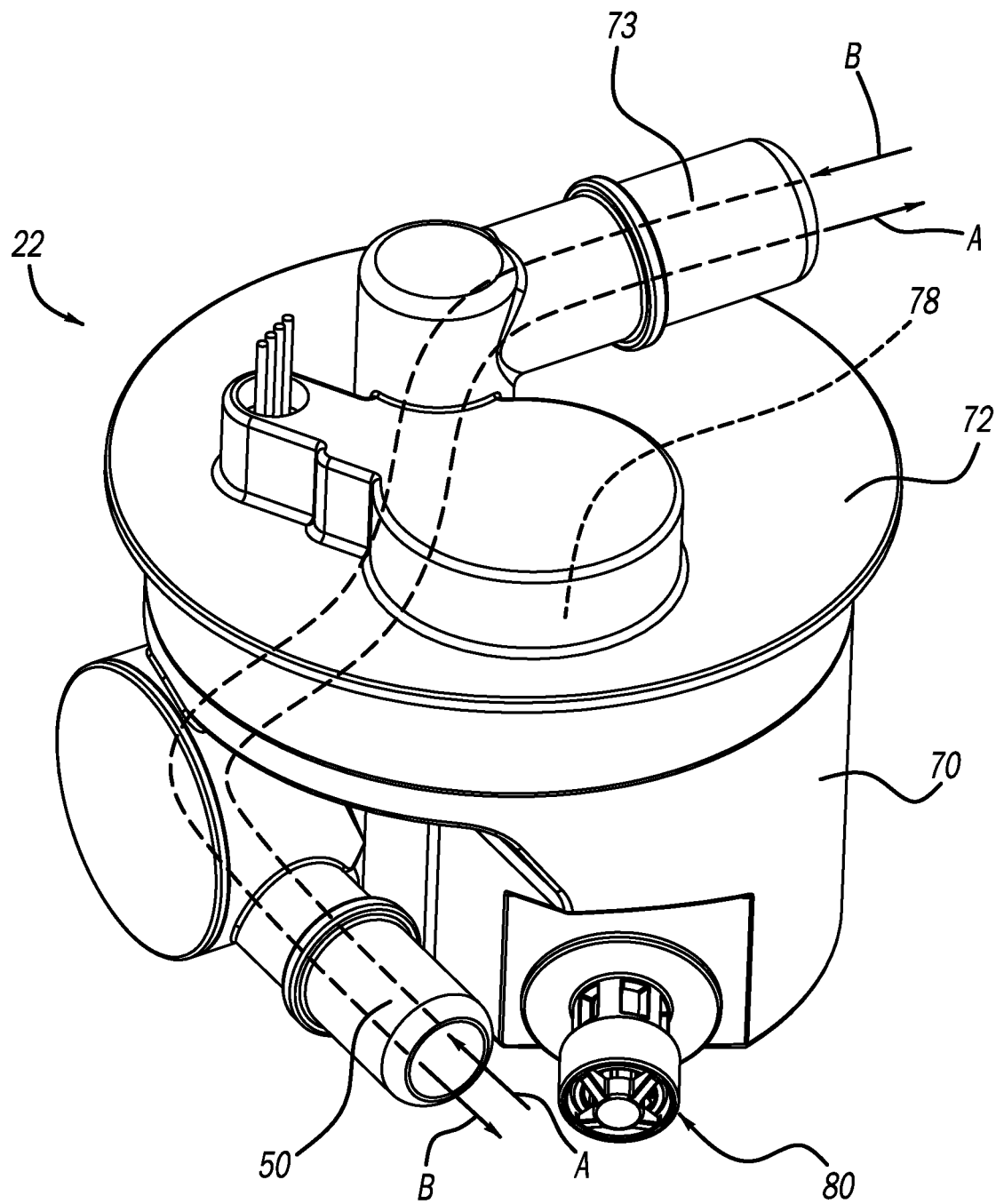
FIG. 2 is a front perspective view of an evaporative emissions control system including a vent shut-off assembly configured with solenoids according to one example of the present disclosure.
Figure 3:
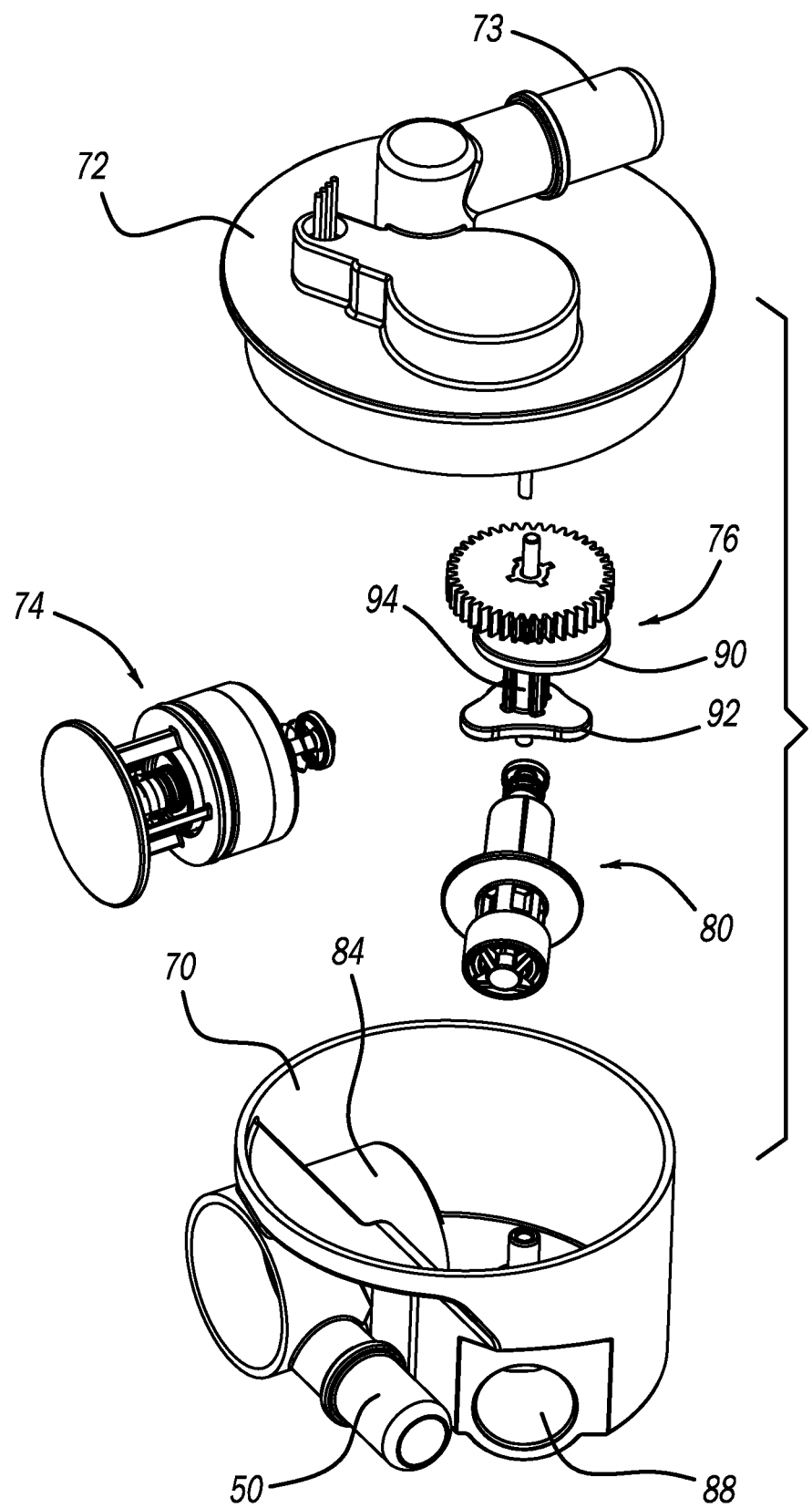
FIG. 3 is an exploded view of the evaporative emissions control system of FIG. 2.

With additional reference to FIGS. 2 and 3, the vent shut-off assembly 22 will be further described. The vent shut-off assembly 22 generally comprises a main housing 70, a top housing 72 having a canister line port 73, a poppet valve assembly 74, a cam assembly 76, a motor 78 and a pump 80. The motor 78 and the cam assembly 76 can collectively define an actuator assembly 81. The main housing 70 and the top housing 72 can collectively define a chamber that includes the manifold assembly 24. The main housing 70 can define a poppet assembly receiving bore 84 and a pump outlet opening 88. The poppet assembly receiving bore 84 leads to the vent line port 50 and receives the poppet valve assembly 74. The pump outlet opening 88 generally mounts the pump 80 and provides an outlet for pumping liquid out of the main housing 70 as will be described in detail herein. A vent line 89 can be fluidly connected between the canister line port 73 of the vent shut-off assembly 22 and the canister 32.

Figure 8A:
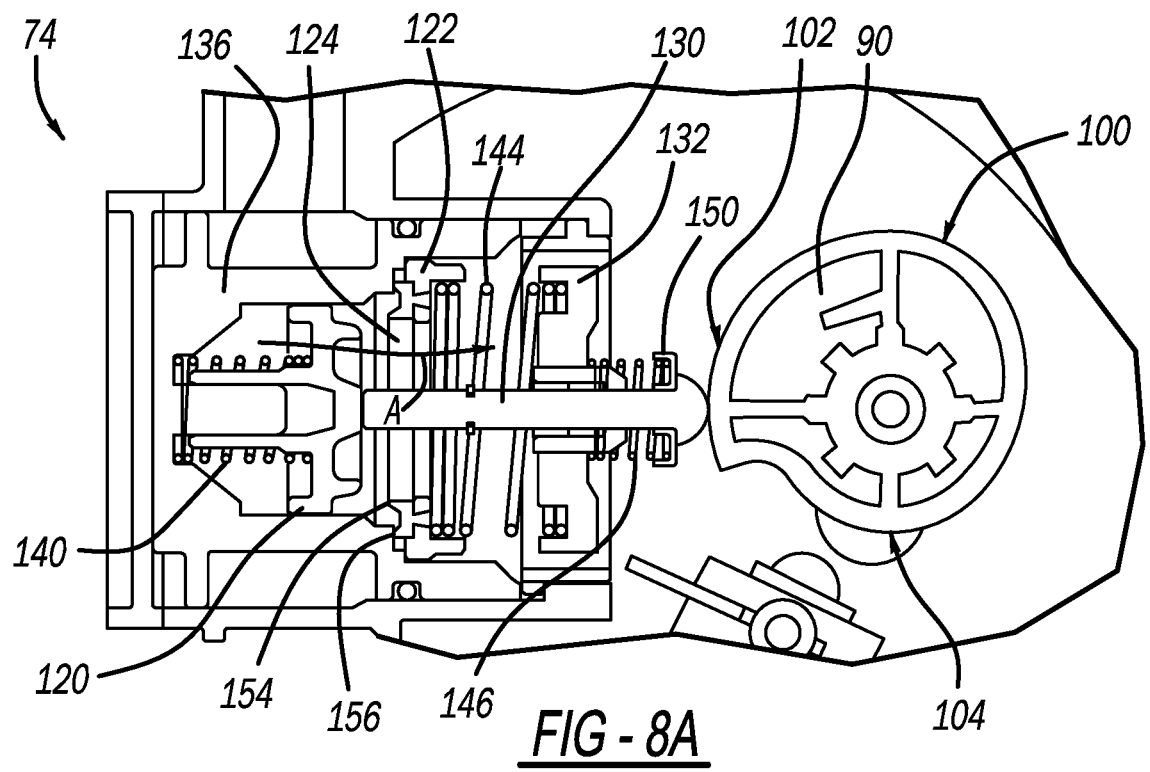
FIG. 8A is a first cross-sectional view of the poppet assembly during the conditions shown in FIGS. 4A and 4B.
Figure 8B:
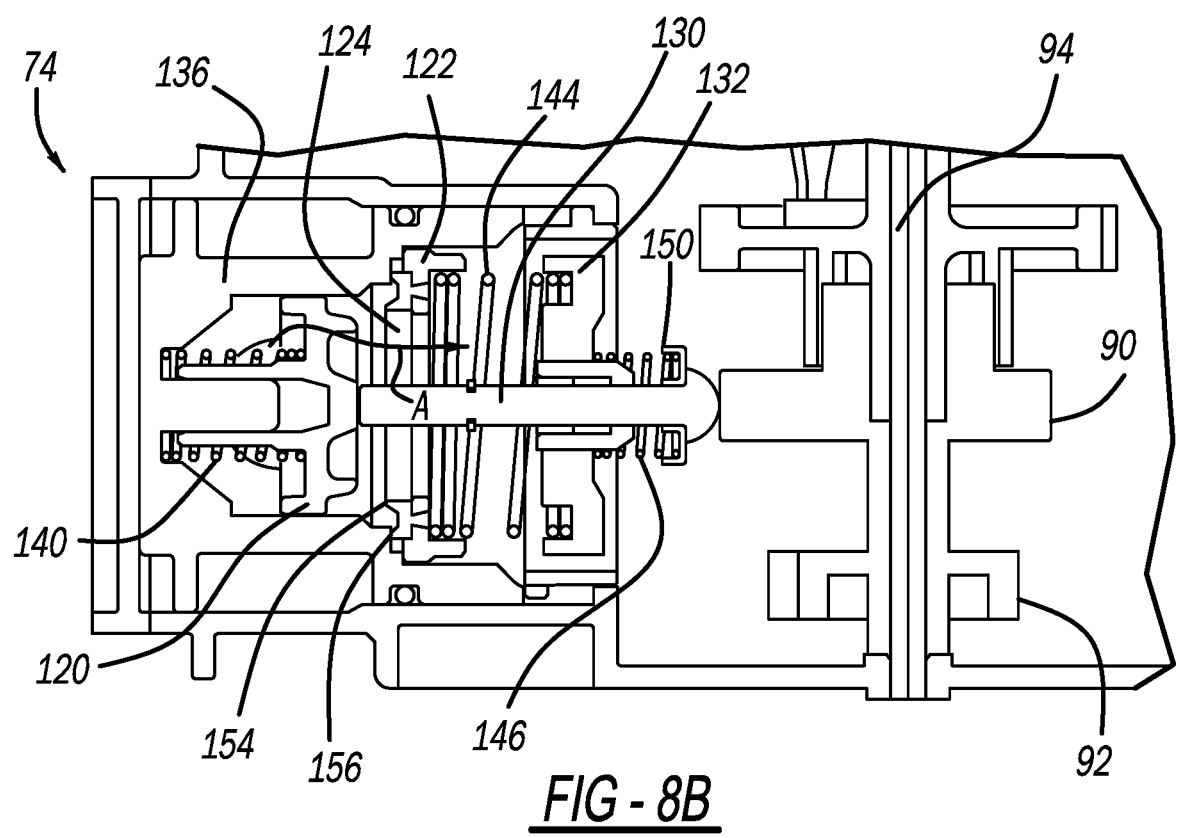
FIG. 8B is a second cross-sectional view of the poppet assembly during the conditions shown in FIGS. 4A and 4B.
Figure 9A:
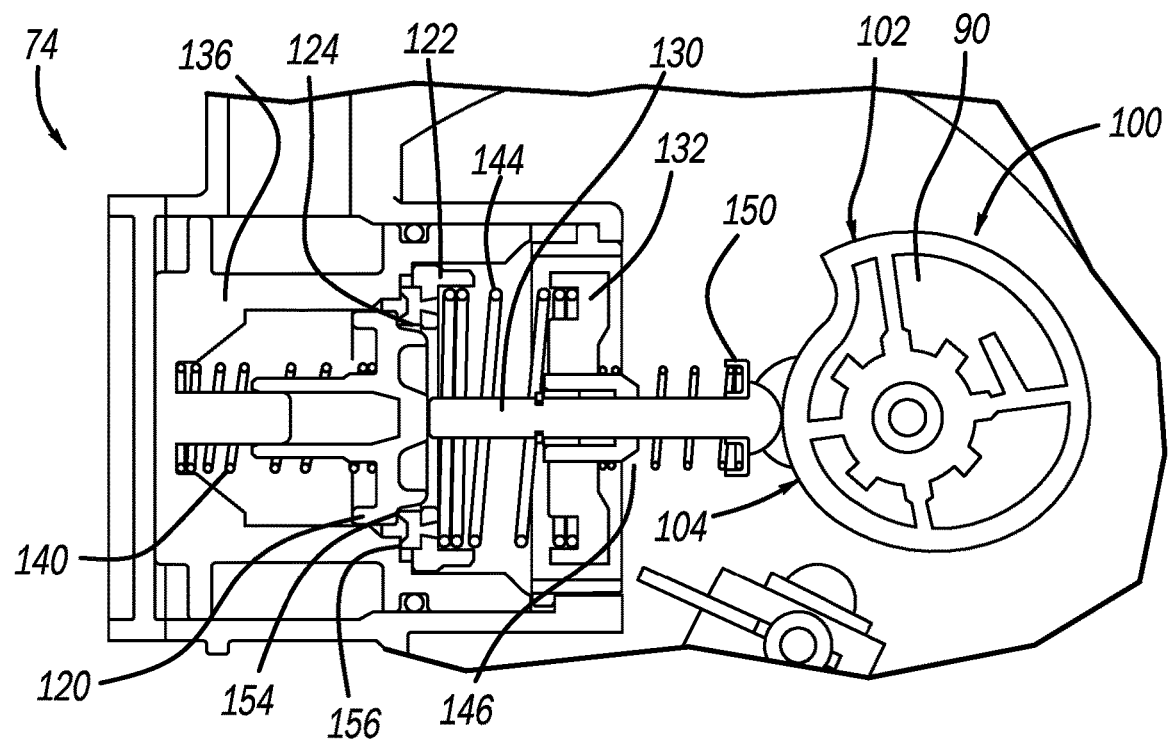
FIG. 9A is a first cross-sectional view of the poppet assembly during the conditions shown in FIGS. 5A and 5B.
Figure 9B:
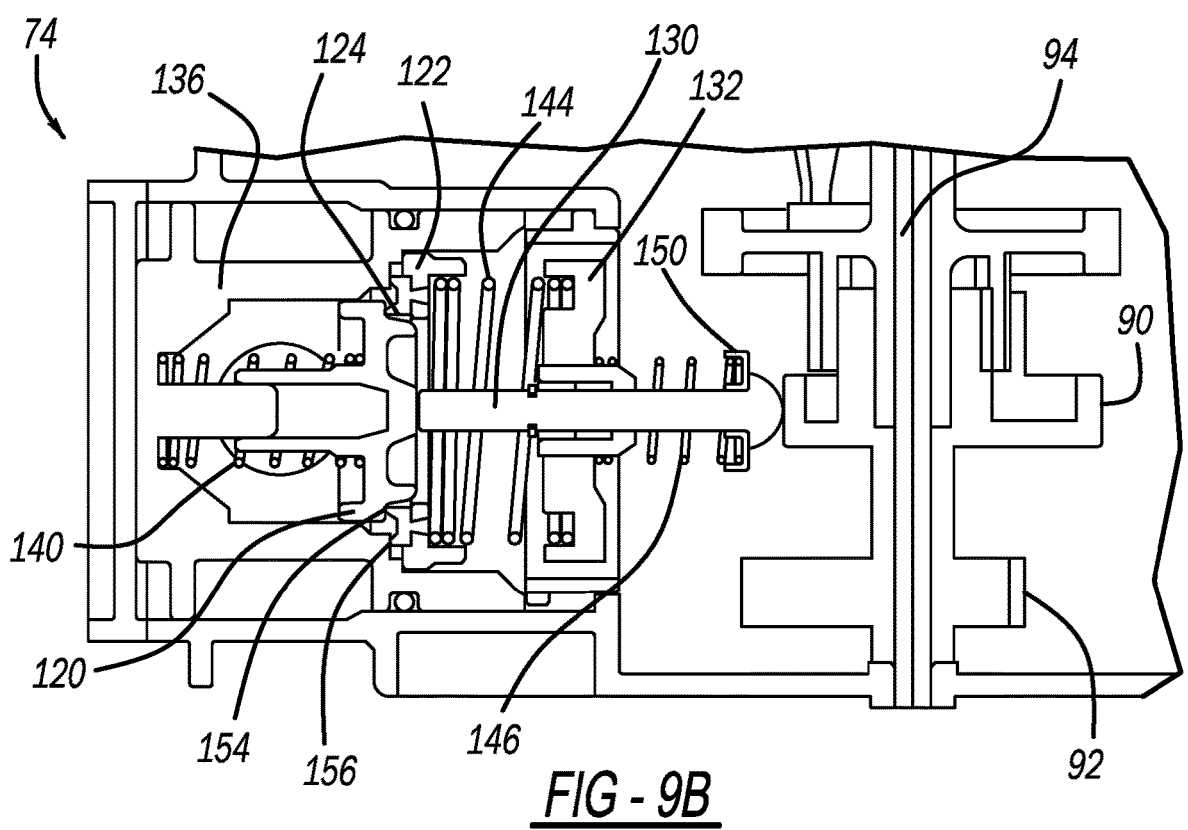
FIG. 9B is a second cross-sectional view of the poppet assembly during the conditions shown in FIGS. 5A and 5B.
Figure 10A:
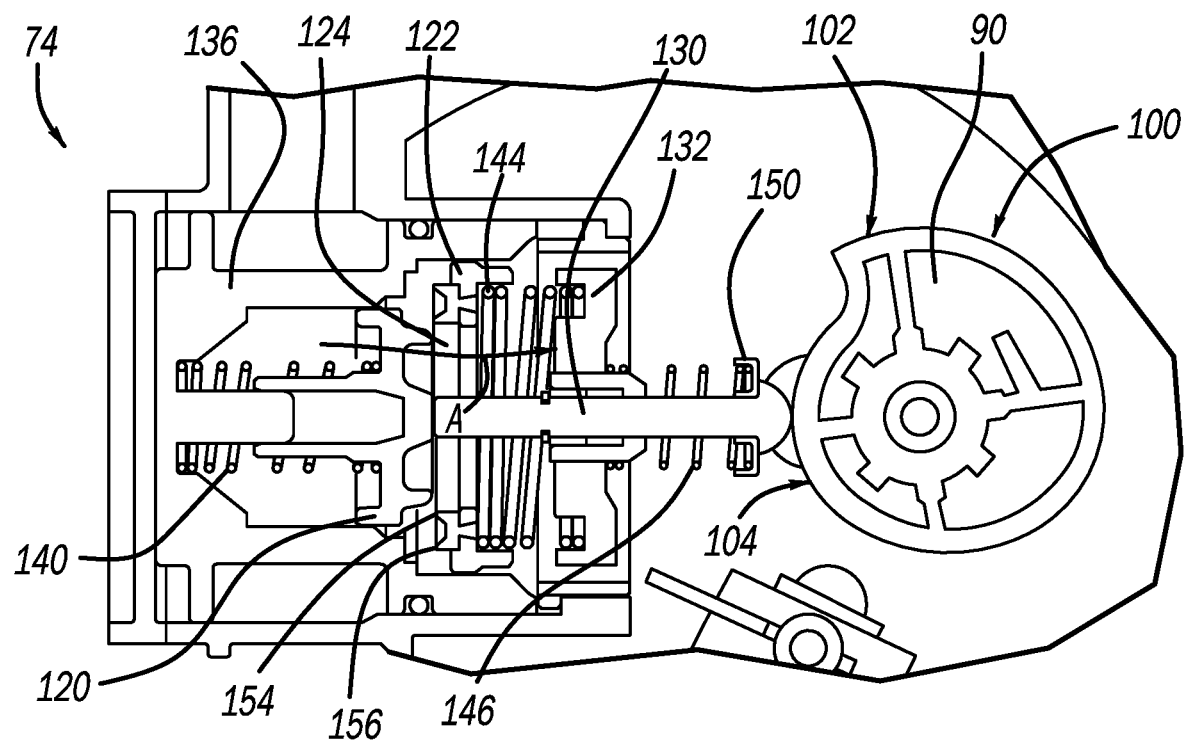
FIG. 10A is a first cross-sectional view of the poppet assembly during the conditions shown in FIGS. 6A and 6B.
Figure 10B:
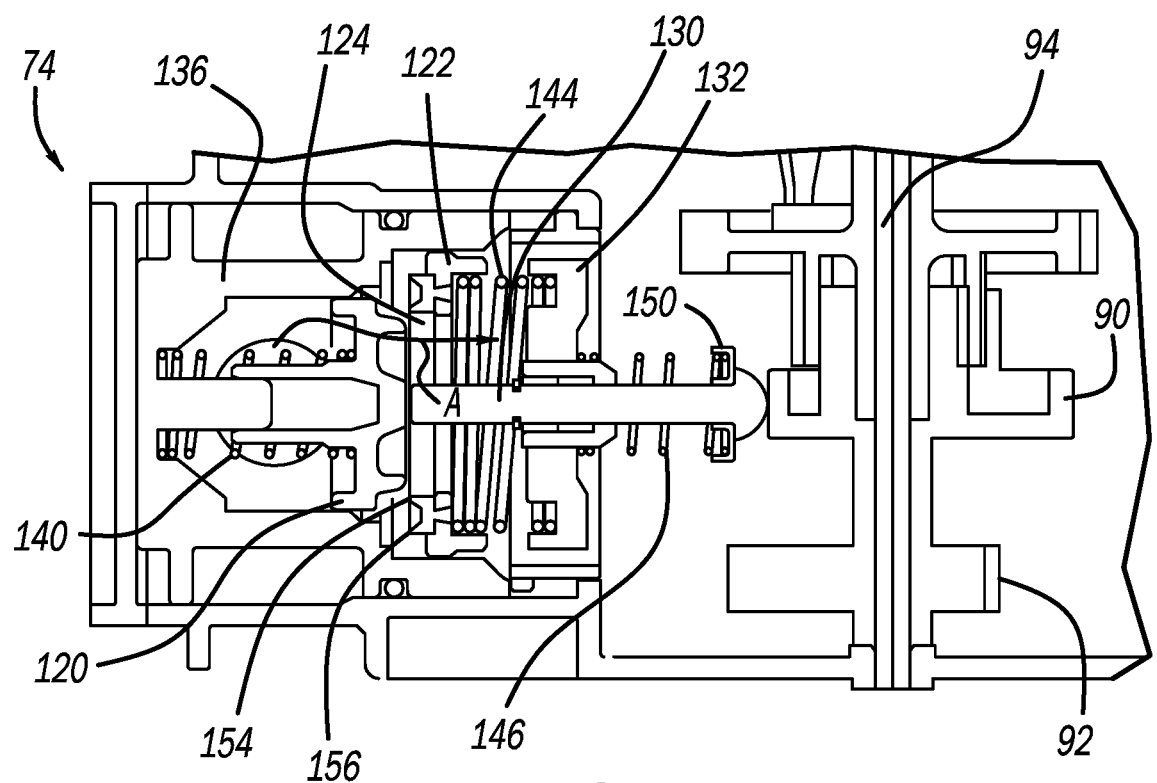
FIG. 10B is a second cross-sectional view of the poppet assembly during the conditions shown in FIGS. 6A and 6B.
Figure 11A:
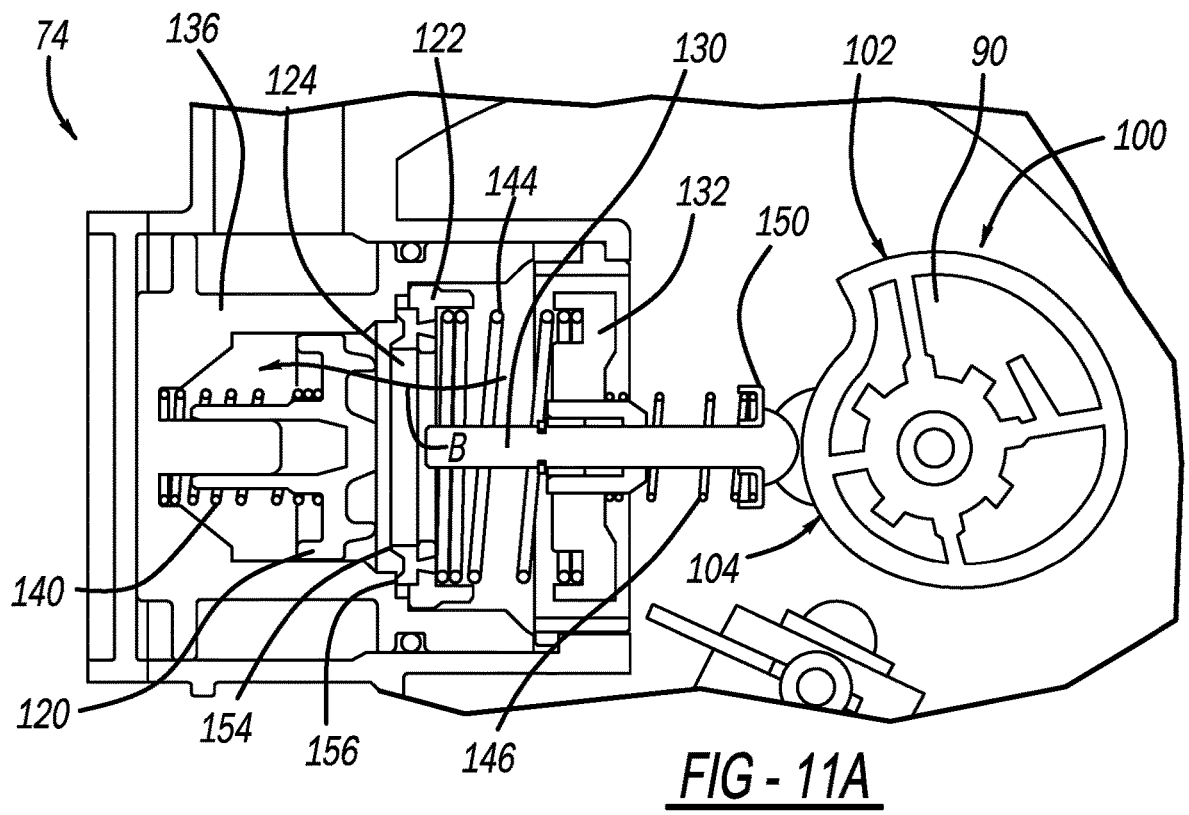
FIG. 11A is a first cross-sectional view of the poppet assembly during the conditions shown in FIGS. 7A and 7B.
Figure 11B:
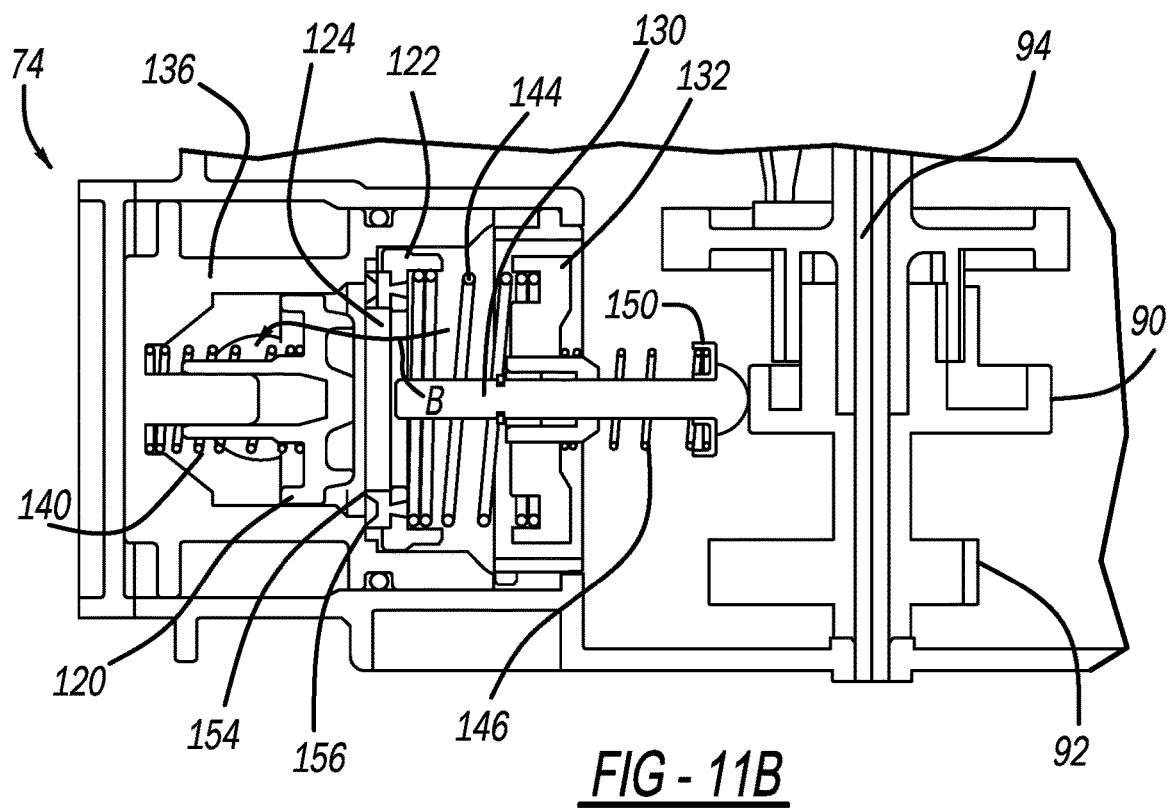
FIG. 11B is a second cross-sectional view of the poppet assembly during the conditions shown in FIGS. 7A and 7B.
Figure 12A:
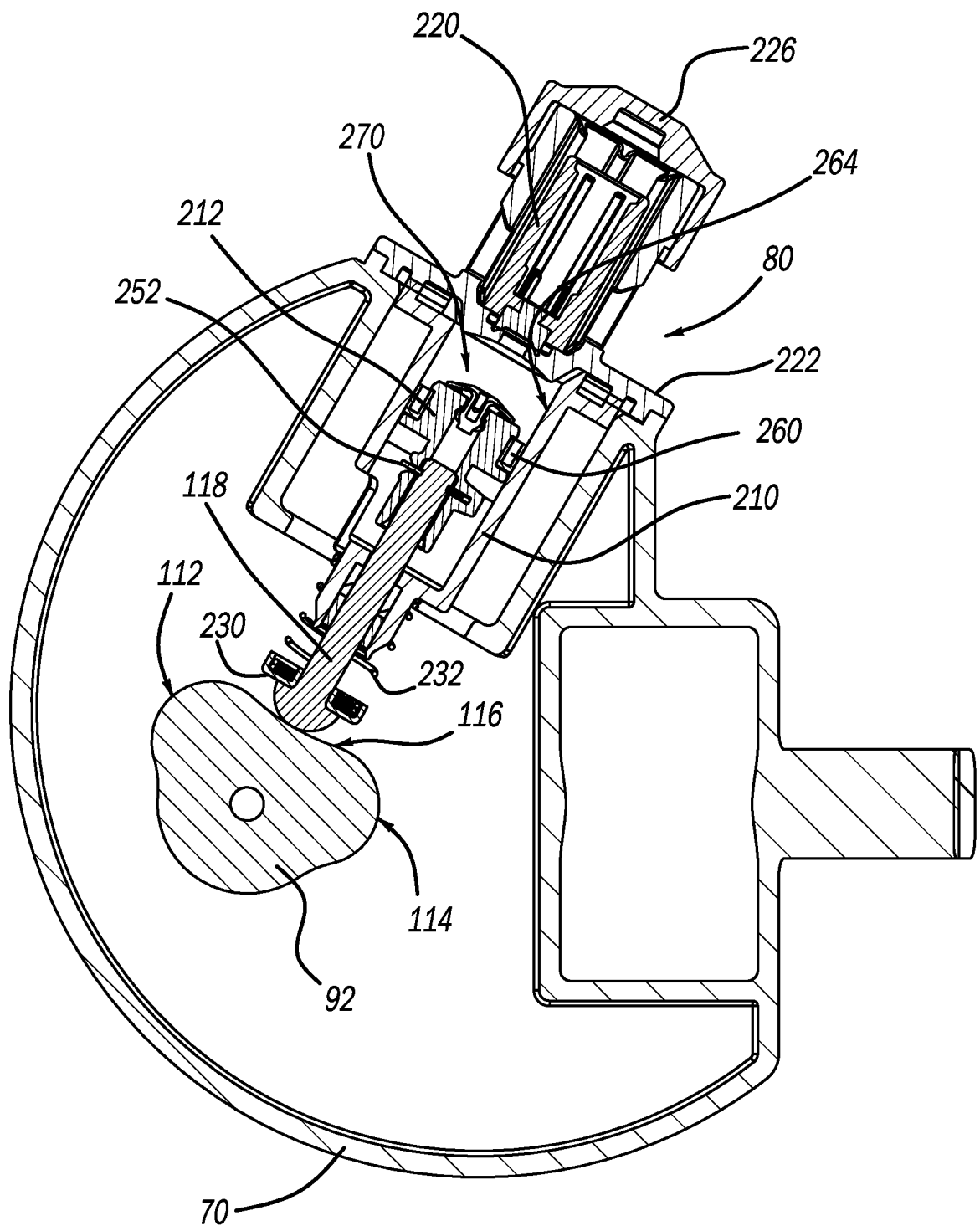
FIG. 12A is a cross-sectional view of the vent shut-off assembly taken through a pump and shown with a push pin 118 in an extended position.
Figure 12B:
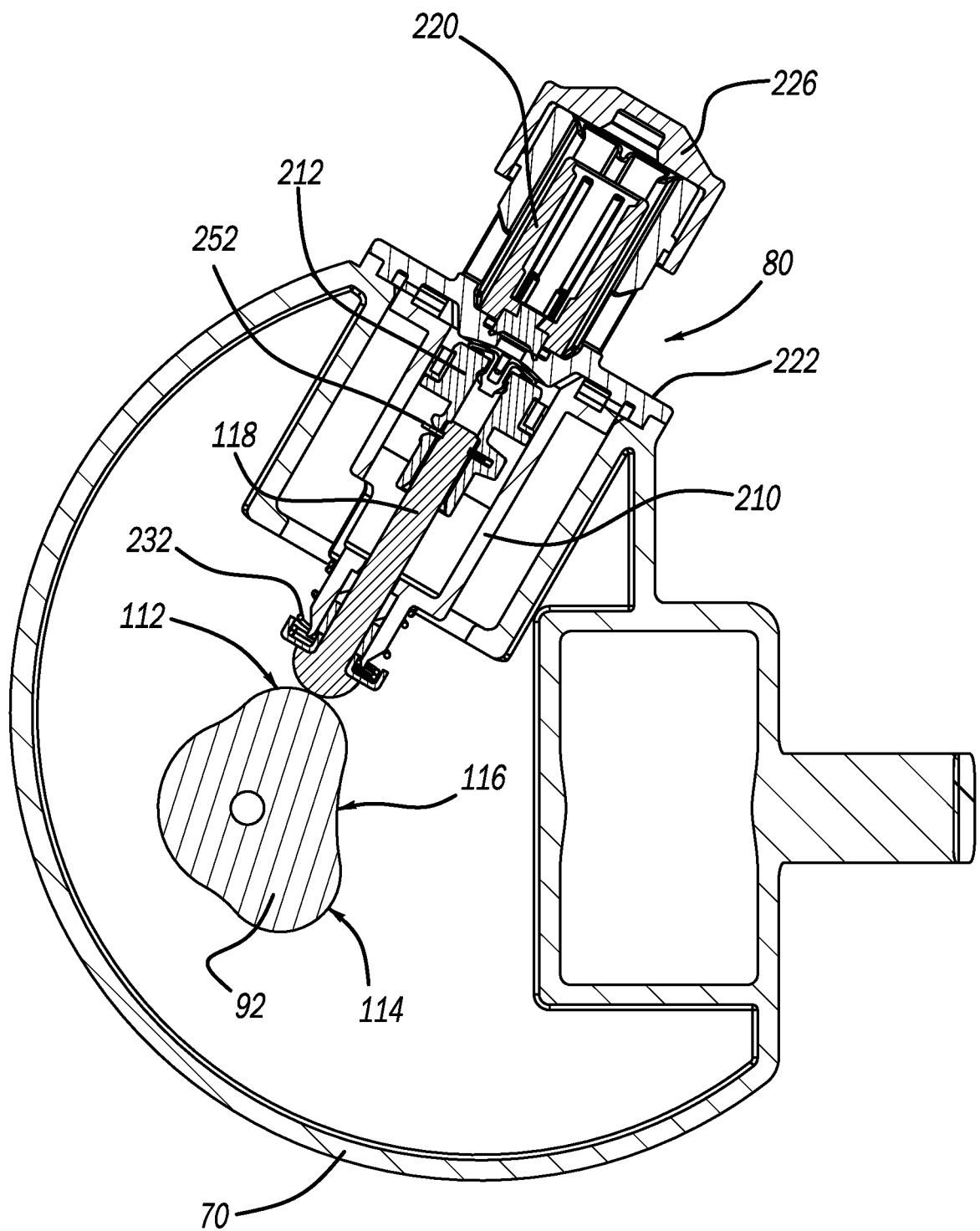
FIG. 12B is a cross-sectional view of the vent shut-off assembly taken through the pump and shown with the push pin 118 in a depressed position.
Figure 13:
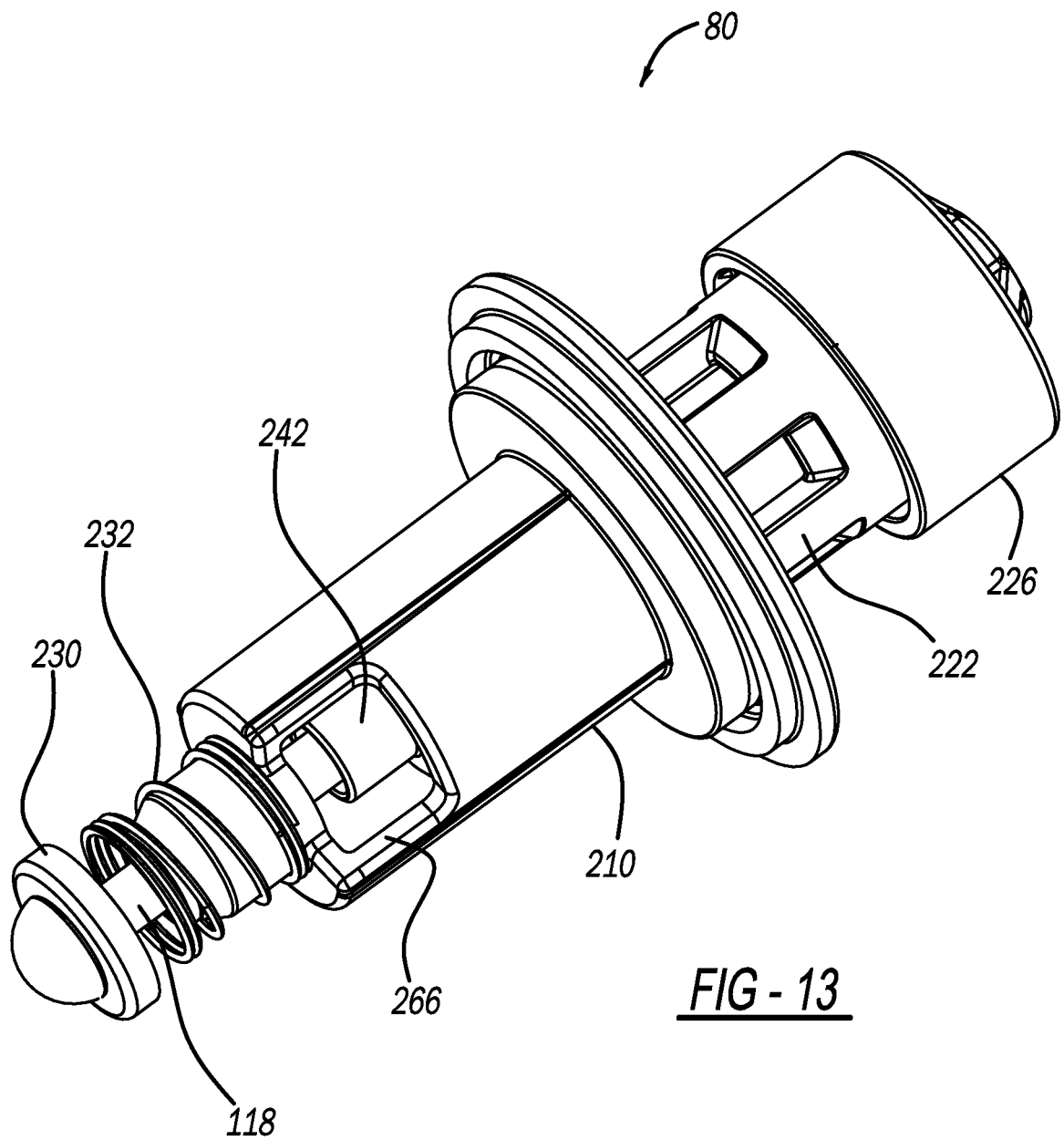
FIG. 13 is a perspective view of the pump.
Figure 14:
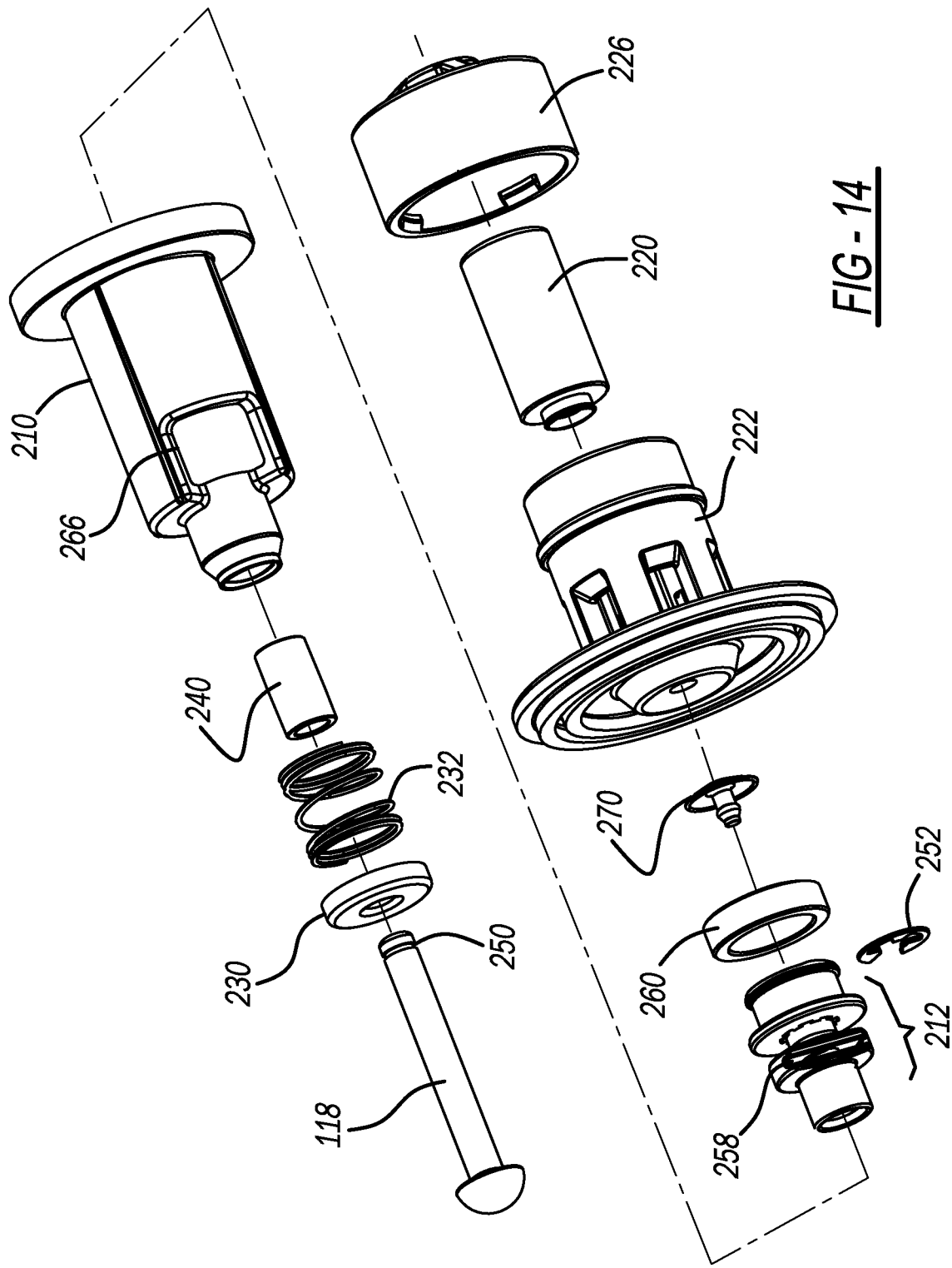
FIG. 14 is an exploded perspective view of the pump of FIG. 13.

The cam assembly 76 generally includes a first or poppet cam 90 and a second or pump cam 92. The first and second cams 90, 92 are mounted for rotation with a cam shaft 94. A gear 96 is meshingly engaged with a complementary gear (not shown) extending from the motor 78. In other examples the gear 96 can be directly coupled for rotation with a motor drive shaft. The first cam 90 (see FIG. 8A) generally includes a cam surface 100 having a generally high lift surface 102 and a low lift surface 104. The second cam 92 (FIG. 12A) generally includes lift lobes 112, 114 separated by a valley 116. As will become appreciated herein, movement of the cam 92 causes a push pin 118 extending from the pump 80 to translate along its axis as it slidably negotiates along the cam 92 between the lift lobes 112, 114 and the valley 116 causing the pump 80 to pump liquid fuel out of the main housing 70. The push pin 118 is urged into engagement with the cam 92 by a pin biasing member 119.

Figures 4A, 4B:
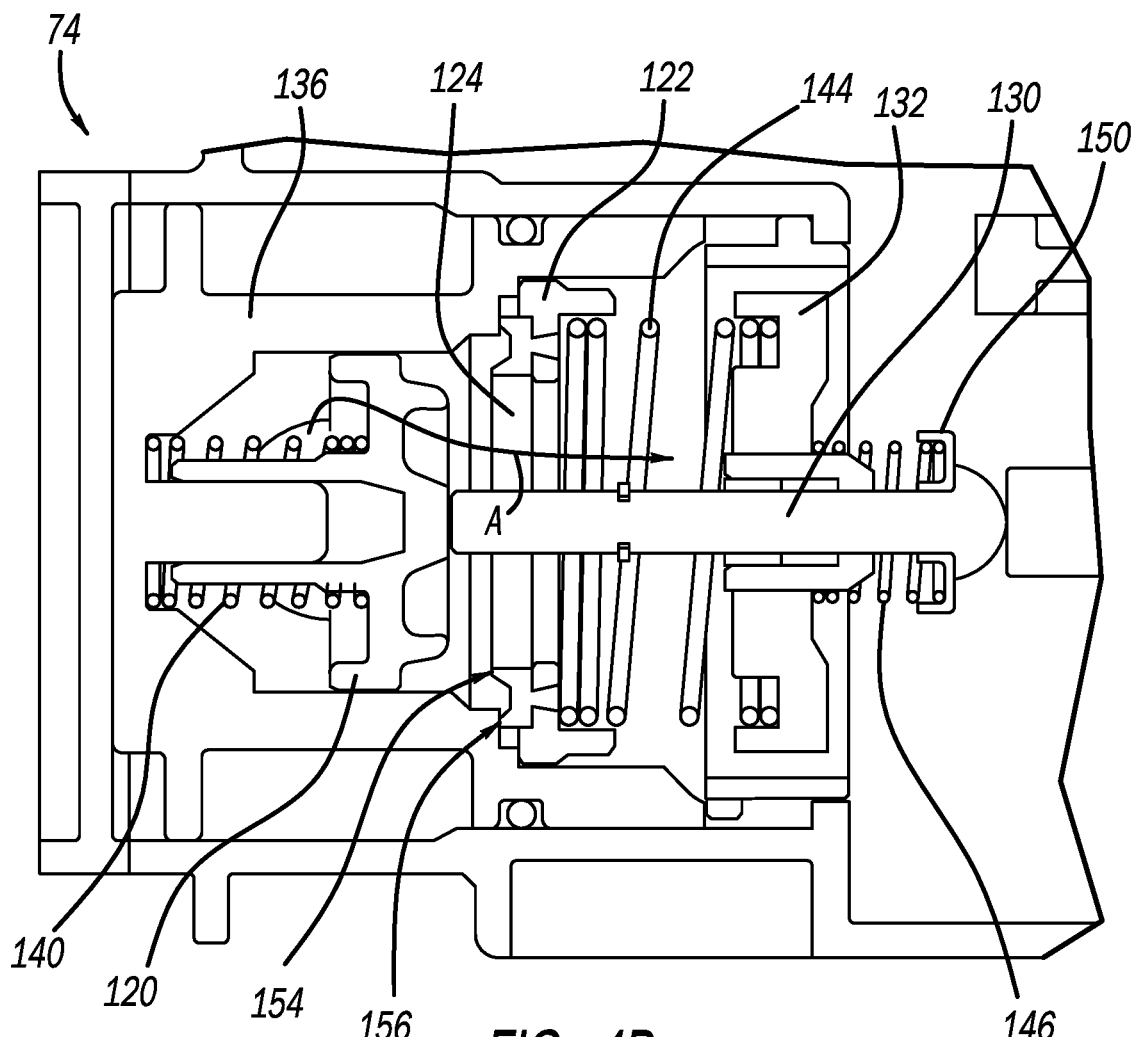
FIG. 4A is a table illustrating operating conditions for the poppet valve assembly shown in FIG. 4B.
FIG. 4B is a cross-sectional view of the poppet assembly during the conditions shown in FIG. 4A.
Figures 5A, 5B:
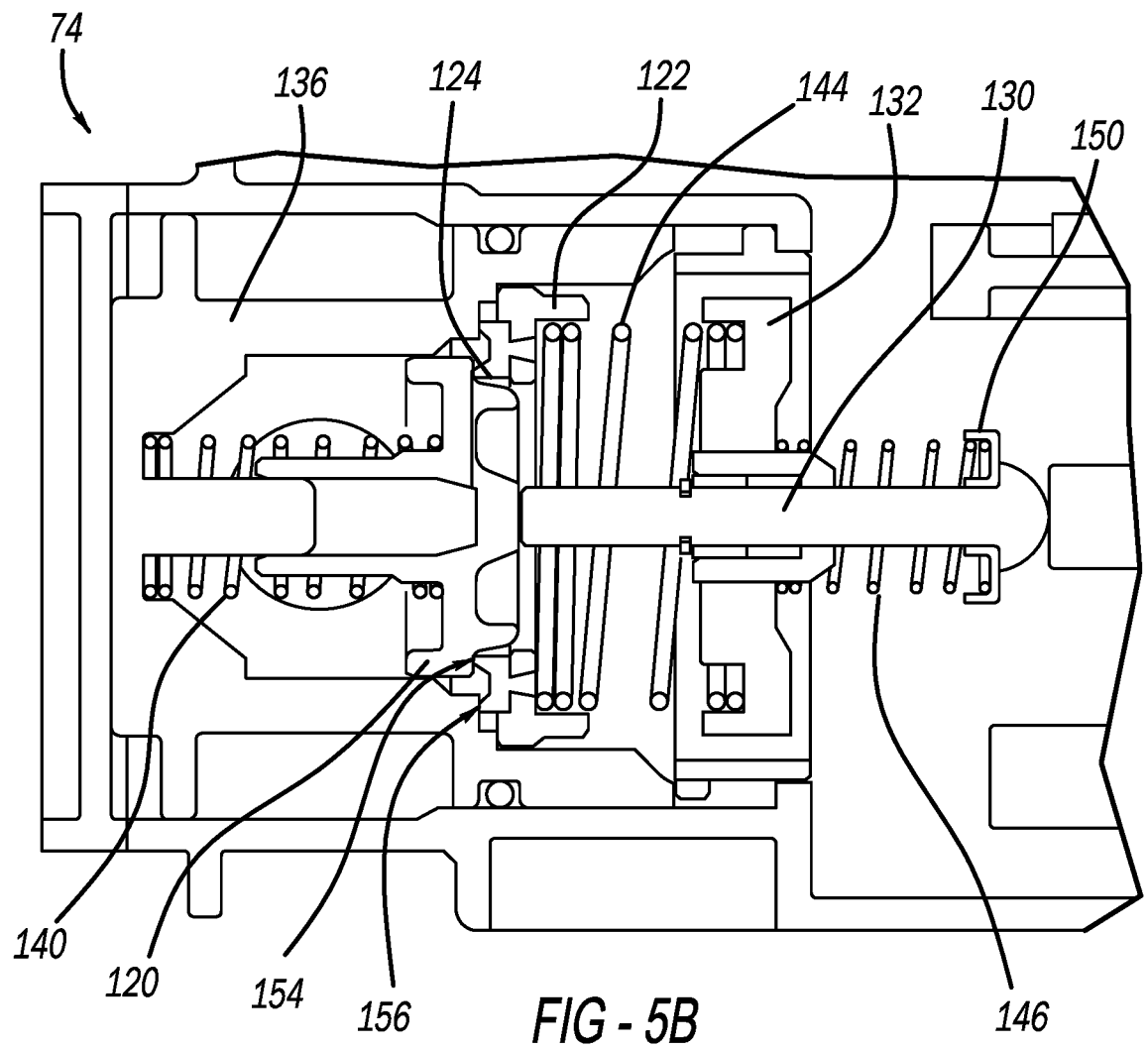
FIG. 5A is a table illustrating operating conditions for the poppet valve assembly shown in FIG. 5B.
FIG. 5B is a cross-sectional view of the poppet assembly during the conditions shown in FIG. 5A.

With additional reference now to FIG. 4B, the poppet valve assembly 74 will be further described. The poppet valve assembly 74 includes a poppet 120, a disk 122 that supports a seal member 124, a pin 130, a retainer 132 and a poppet carrier 136. A first biasing member 140 is biased between the poppet 120 and the carrier 136. A second biasing member 144 is biased between the disk 122 and the retainer 132. A third biasing member 146 is biased between the retainer 132 and a collar 150 on the pin 130. The seal member 124 includes an inner lip seal 154 and an outer lip seal 156.

As will become appreciated from the following discussion, the poppet valve assembly 74 will be described as moving between fully open and closed positions for achieving various operating functions. However, the poppet valve assembly 74 and other components (such as the disk 122) can move to attain positons intermediate "fully open" and "fully closed". In this regard, it may be desirable, based on operating conditions, to vent the fuel tank 12 to the carbon canister 30 a predetermined amount between fully open and fully closed.

Figures 6A, 6B:
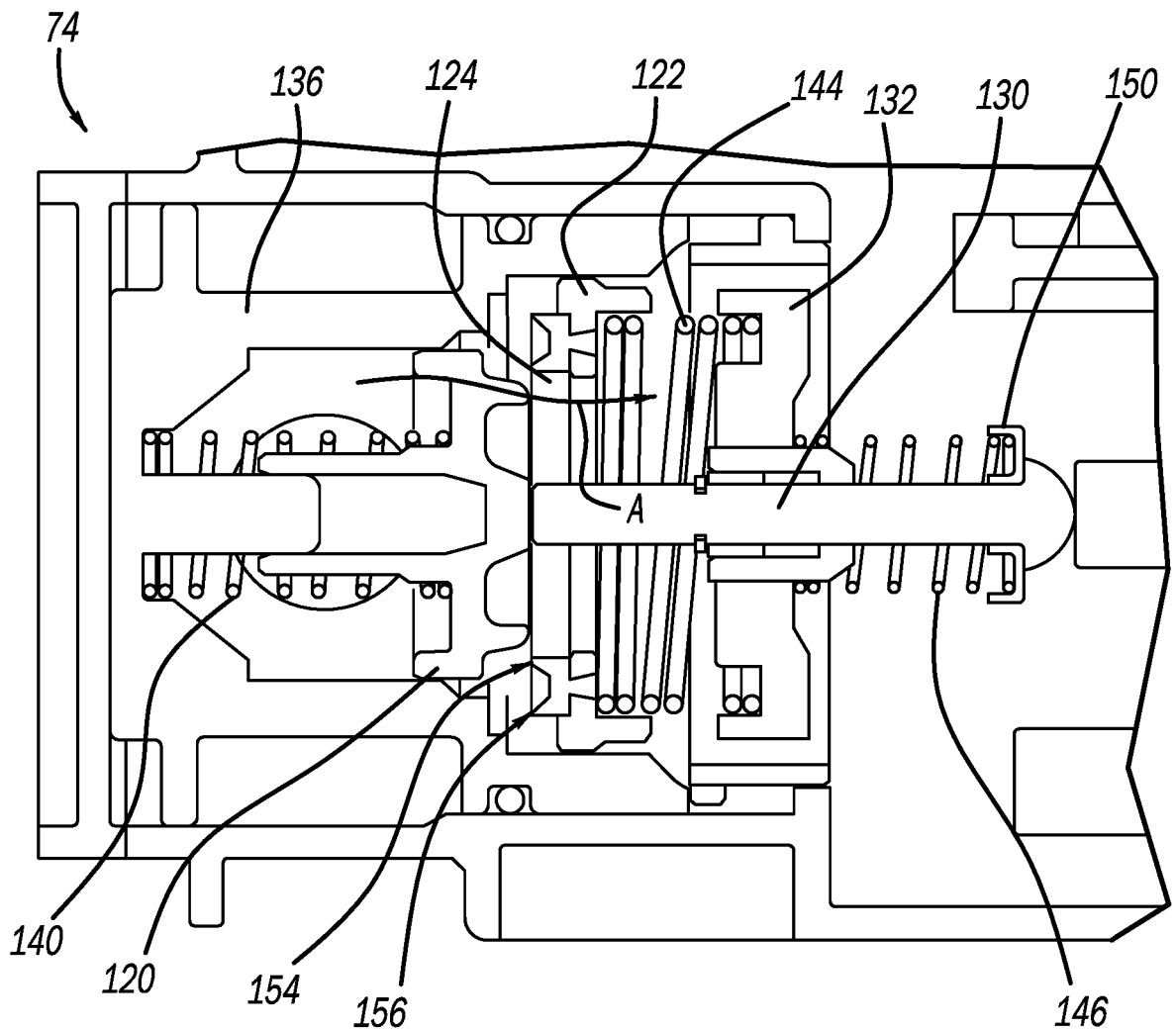
FIG. 6A is a table illustrating operating conditions for the poppet valve assembly shown in FIG. 6B.
FIG. 6B is a cross-sectional view of the poppet assembly during the conditions shown in FIG. 6A.
Figures 7A, 7B:
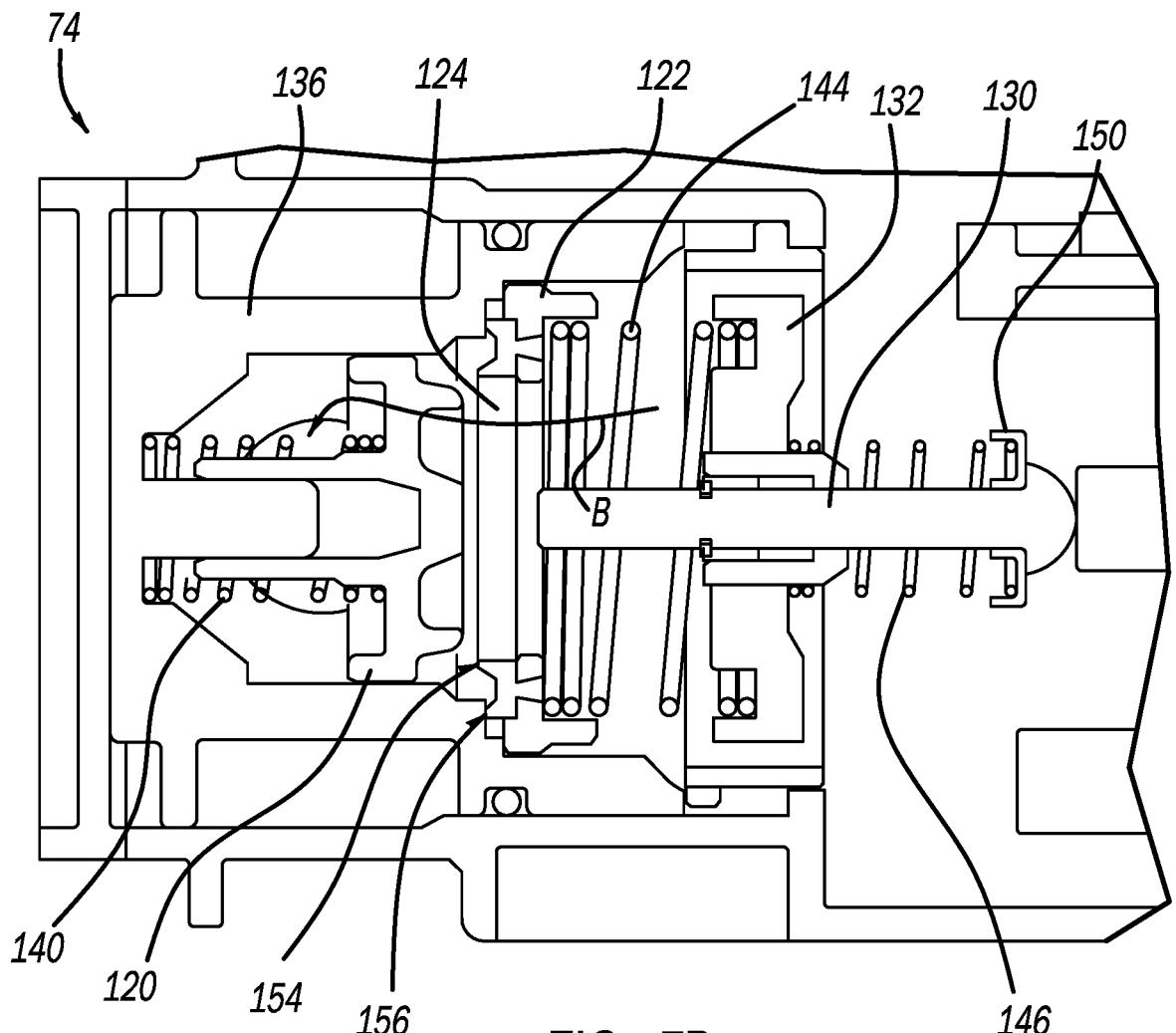
FIG. 7A is a table illustrating operating conditions for the poppet valve assembly shown in FIG. 7B.
FIG. 7B is a cross-sectional view of the poppet assembly during the conditions shown in FIG. 7A.

In general, the poppet valve 74 allows the vent shut-off assembly 22 to operate in various states, depending on operating conditions, to allow vapor to flow along a first path A (from the fuel tank 12 to the carbon canister 32) or a second path B (from the carbon canister 32 to the fuel tank 12). In one operating condition, vapor that enters at least one of the LVD valves 41A, 41B, 41C passes along at least one of the vapor lines 40, 42, 43 and enters the vent shut-off assembly 22. The operating state of the poppet valve 74, as described herein, allows the vapor to pass therethrough and out of the canister line port 73 to the carbon canister 32 (see flow path A, FIG. 2). Flow path A is desirable alleviate high pressure within the vapor space 18 of the fuel tank. Flow path A can also be desirable during a refueling event or other operating conditions that may cause pressure to rise above a threshold. As will become appreciated herein, the poppet valve 74 can be commanded to move (by the controller 30, FIGS. 4A, 4B) to achieve flow path A or, can automatically move to achieve flow path A (over pressure relief condition, FIGS. 6A, 6B). In another operating condition, fresh air is permitted to pass from the carbon canister 32, into the vent shut-off assembly 22. The operating state of the poppet valve 74 allows that fresh air to exit the vent shut-off assembly 22 through the vent line port 50 and backflow into the vapor space 18 through at least one of the LVD valves 41A, 41B,

41C. Flow path B is desirable to alleviate an undesirable vacuum condition within the vapor space 18 of the fuel tank 12.

With specific reference now to FIGS. 4A, 4B, 8A and 8B the poppet valve assembly 74 is shown during normal operation in a fully open position. Explained further, the first cam 90 is rotated to a position wherein the high lift surface 102 urges the pin 130 to be depressed or translated leftward as viewed in the FIGS. Translation of the pin 130 causes the poppet 120 to be lifted off of sealing engagement with the inner lip seal 154 of the seal member 124 and into the bias of the first biasing member 140. When the poppet 120 is in the open position, the vapor flow is permitted along flow path A into the vent line port 50 and out of the canister port 73. Fuel vapor from the vapor space 18 is caused to be vented to the canister 32.

With specific reference now to FIGS. 5A, 5B, 9A and 9B the poppet valve assembly 74 is shown during normal operation in a fully closed position. Explained further, the first cam 90 is rotated to a position wherein the low lift surface 104 aligned with the pin 130 such that bias of the first biasing member 140 causes the pin to be translated rightward as viewed in the FIGS. Translation of the pin 130 rightward causes the poppet 120 to attain a sealing engagement with the inner lip seal 154 of the seal member 124. When the poppet 120 is in the closed position, the vapor flow is inhibited from flowing into the vent line port 50 and out of the canister port 73. Fuel vapor from the vapor space 18 is precluded from venting to the canister 32. Flow along either of flow paths A or B is inhibited.

With reference now to FIGS. 6A, 6B, 10A and 10B, the poppet valve assembly 74 is shown during an over pressure relief (OPR) condition. In an OPR condition, pressure within the vapor space 18 of the fuel tank 18 has exceeded a threshold wherein vapor pressure in the fuel tank 12 is great enough to cause the seal member 124 to be lifted off of a sealed position with the carrier 136. In one example, the threshold can be around 14 kPa for a conventional fuel vehicle and around 37 kPa for a pressurized/hybrid vehicle. Explained further, the seal member 124 is caused to translate rightward as viewed in the FIGS. such that the outer lip seal 156 moves off of a sealed relationship with the carrier 136. The outer lip seal 156 acts as an OPR seal. In the OPR condition, fuel vapor from the vapor space 18 is caused to flow along flow path A and be vented to the canister 32. Notably, the seal member 124 can move rightward in an OPR condition without any command from the controller 30.

With reference now to FIGS. 7A, 7B, 11A and 11B, the poppet valve assembly 74 is shown during an over vacuum relief (OVR) condition. In an OVR condition, pressure within the vapor space 18 of the fuel tank 18 has dropped below a threshold wherein vapor pressure in the fuel tank is low enough to cause a vacuum wherein the poppet 120 is lifted off of sealing engagement with the inner lip seal 154 of the seal member 124 and into the bias of the first biasing member 140. When the poppet 120 is in the open position, the vapor flow is permitted to equalize pressures. In other words, vapor is permitted to flow along flow path B (from the canister 32 through the canister line 89) out of the vent line port 50 and into the vapor space 18. Notably, the poppet 120 can move leftward in an OVR condition without any command from the controller 30.

With reference now to FIGS. 12A-FIG. 14, the pump 80 will be further described. The pump 80 is configured to pump liquid fluid out of the vent shut off assembly 22. As will become appreciated, rotation of the cam assembly 76 (FIG. 3) ultimately actuates the pump 80. The pump 80 generally includes a piston housing 210, a piston 212, a check valve plunger 220, a check valve housing 222 and a cap 226. The push pin 118 extends through a spring cap 230, a pump spring 232 and a bearing 240.

The push pin 118 further extends into the piston housing 210 and is coupled to the piston 212. In particular, the push pin 118 defines an annular recess 250 that receives a snap ring 252 thereat. The snap ring 252 can be inserted through a window 258 defined in the piston 212 to engage the push pin 118. The push pin 118 therefore engages the cam 92 on a first end and is fixed for translation with the piston on a second end. A seal 260 is received around an annular surface of the piston 212. The seal 260 slidably translates along an inner diameter 264 (FIG. 12A) of the piston housing 210 during pumping. An umbrella seal assembly 270 has an outer seal member 272 disposed on an outboard end of the piston 212.

The piston housing 210 defines a housing window 266. The housing window 266 allows liquid fuel to enter the piston housing 210 where it can be pumped out of the vent shut off assembly 22. The window 266 can also be used to gain access to the pin 118 when assembling the snap ring 252 at the annular recess 250.

The check valve plunger 220 can cooperate with the check valve housing 222 and the cap 224 to permit liquid fuel from exiting the check valve housing 222 (out of the vent shut off assembly 22) while inhibiting liquid fuel from entering the vent shut off assembly 22 (through the check valve housing 222). The check valve plunger 220 can take many forms for accomplishing one way fluid flow. In this regard, the specific geometry shown in the FIGS is merely exemplary and other check valves may be used within the scope of this disclosure.

Operation of the pump 80 will now be described according to one exemplary method of operation. When the lift lobes 112 and 114 of the second cam 92 are aligned with the push pin 118 of the pump 80, fluid that may have passed through the LVD valves 41A, 41B and 41C, to be pumped out of the housing 70. When the valley 116 is aligned with the push pin 118, the biasing member 232 urges the push pin 118 to retract. When the push pin moves from the location shown in FIG. 12A to the position shown in FIG. 12B, liquid fuel in the piston housing 210 is urged by the piston 212 to be expelled into the check valve housing 222 where the check valve plunger 220 permits the liquid fuel to exit the check valve housing 222 and ultimately the vent shut off assembly 22. The pump 80 can be a piston pump or any pump suitable to pump liquid fuel out of the vent shut off assembly 22. By way of example only, the pump can be configured to pump 1-3 cubic centimeters of liquid fuel per cycle and have a maximum pump rate of around 8.3 cubic centimeters per minute.

Figure 15:
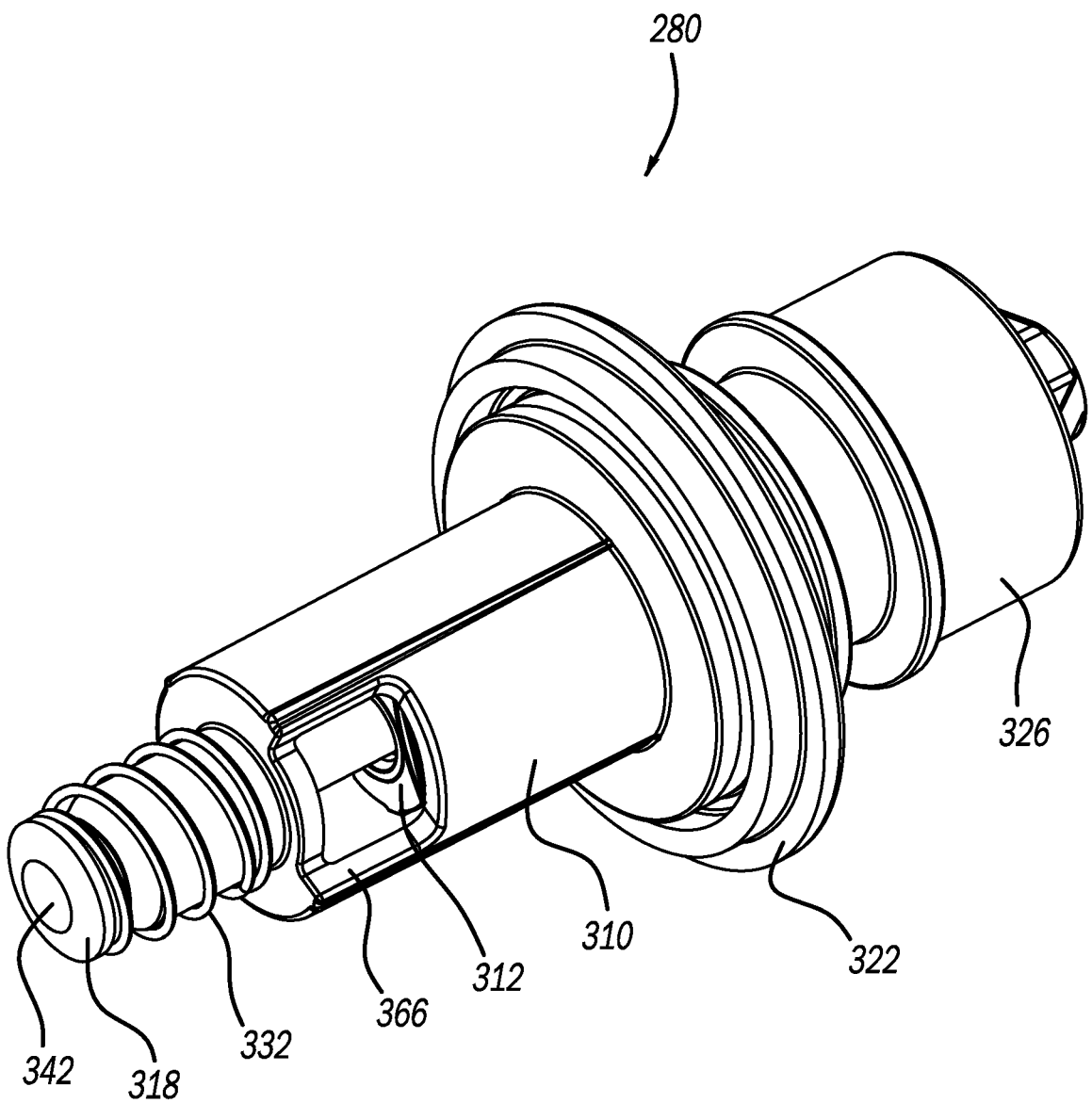
FIG. 15 is a perspective view a pump constructed in accordance to additional features of the present disclosure.
Figure 16:
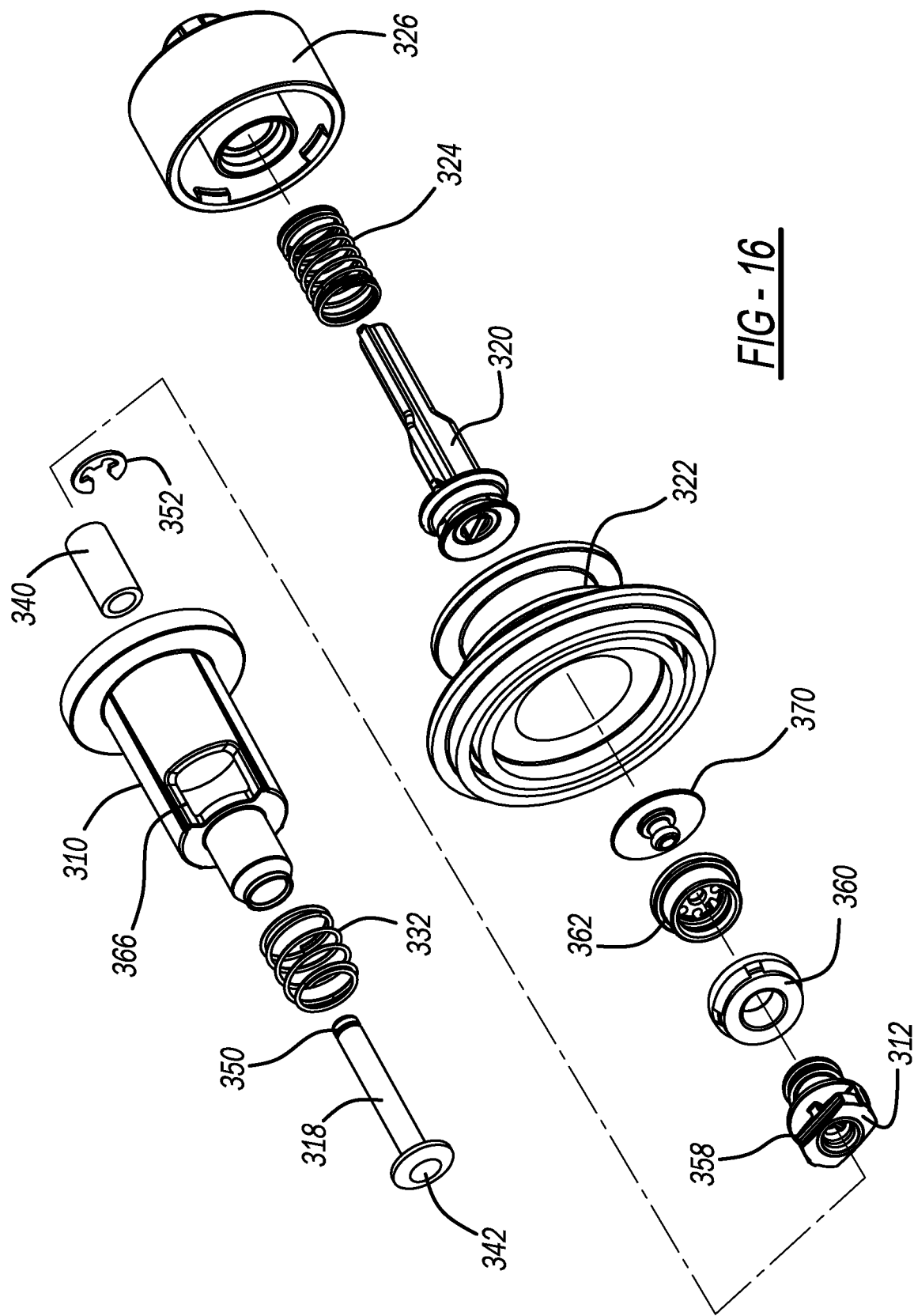
FIG. 16 is an exploded perspective view of the pump of FIG. 15.
Figure 17:
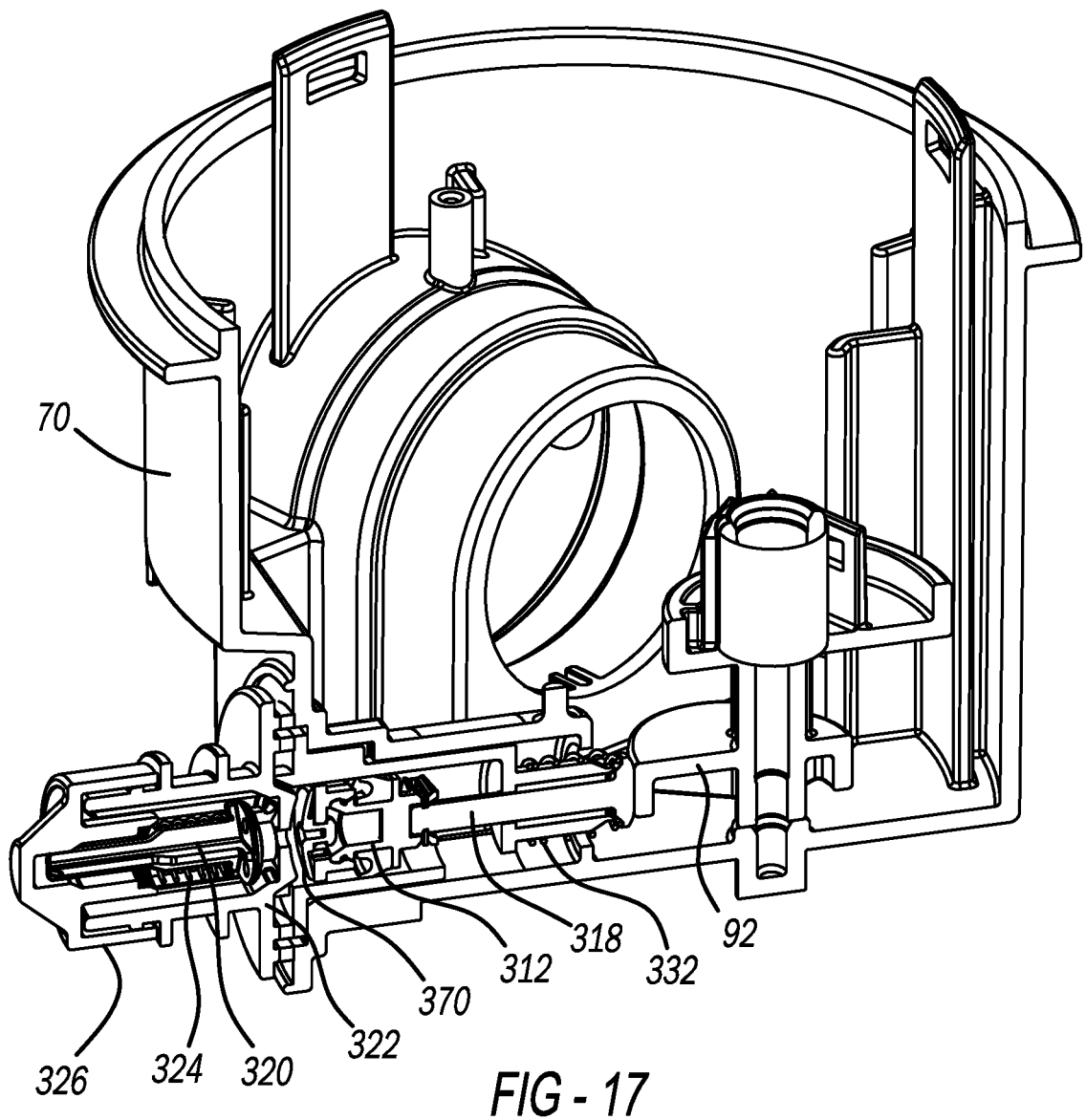
FIG. 17 is a sectional view of the pump shown in FIG. 15 assembled into the main housing of the vent shut-off assembly.

With reference now to FIGS. 15-17, a pump 280 constructed in accordance to additional features will be described. Unless explained otherwise, the pump 280 can function similarly to the pump 80 described above. The pump 280 generally includes a piston housing 310, a piston 312, a check valve plunger 320, a check valve housing 322, a plunger spring 324 and a cap 326. A push pin 318 extends through a pump spring 332 and a bearing 340. A distal tip of the push pin 318 includes a flat 342. The flat 342 can encourage improved communication with the cam 92 (FIG. 12B) during operation.

The push pin 318 further extends into the piston housing 310 and is coupled to the piston 312. In particular, the push pin 318 defines an annular recess 350 that receives a snap ring 352 thereat. The snap ring 352 can be inserted through a window 358 defined in the piston 312 to engage the push pin 318. The push pin 318 therefore engages the cam 92 on a first end and is fixed for translation with the piston 312 on a second end. A seal 360 is received around an annular surface of the piston 312. The seal 360 is received around an annular surface of the piston 312. A piston cap 362 and umbrella seal 370 is disposed on an outboard end of the piston 312. The piston housing 310 defines a housing window 366. The housing window 366 allows liquid fuel to enter the piston housing 310 where it can be pumped out of the vent shut off assembly 22. The window 366 can also be used to gain access to the pin 318 when assembling the snap ring 352 at the annular recess 350.

As identified above, the evaporative emissions control system 20 can replace conventional fuel tank systems that require mechanical components including in-tank valves with an electronically controlled module that manages the complete evaporative system for a vehicle. In this regard, some components that may be eliminated using the evaporative emissions control system 20 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 30, vent shut-off assembly 22, manifold 24, and associated electrical connector 44. Various other components may be modified to accommodate the evaporative emissions control system 20 including the fuel tank 12. For example, the fuel tank 12 may be modified to eliminate valves and internal lines to pick-up points. The flange of the FDM 46 may be modified to accommodate other components such as the control module 30 and/or the electrical connector 44. In other configurations, the fresh air line of the canister 32 and a dust box may be modified. In one example, the fresh air line of the canister 32 and the dust box may be connected to the control module 30.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vent shut-off assembly configured to manage venting on a fuel tank configured to deliver fuel to an internal combustion engine, the vent shut-off assembly comprising:
   a first liquid vapor discriminator (LVD) disposed in the fuel tank;
   a main housing that selectively vents to a carbon canister;
   a poppet valve assembly having a poppet valve arranged in the main housing;
   a pump that selectively pumps liquid fuel from the main housing;
   an actuator assembly at least partially housed in the main housing, the actuator assembly comprising:
      a cam assembly having a cam shaft that includes a first cam and a second cam, wherein:
         the first cam has a profile that one of opens and closes a poppet valve fluidly coupled to the first LVD, wherein when the poppet valve is in a closed position, vapor is precluded from passing from the fuel tank to the carbon canister and wherein when the poppet valve is in an open position, vapor is permitted from passing from the fuel tank to the carbon canister; and
      the second cam has a profile that actuates the pump.

2. The vent shut-off assembly of claim 1 wherein the pump includes a piston housing, a piston that slidably translates within the housing and a check valve that permits liquid fuel from exiting the vent shut-off assembly and inhibits liquid fuel from entering the vent shut-off assembly.

3. The vent shut-off assembly of claim 2 wherein the pump further comprises a push pin that engages the second cam on a first end and is fixed for translation with the piston on a second end.

4. The vent shut-off assembly of claim 3 wherein the push pin includes a flat at the first end, wherein the flat facilitates engagement with the second cam.

5. The vent shut-off assembly of claim 3 wherein the piston housing defines a window that allows liquid fuel to enter the piston housing.

6. The vent shut-off assembly of claim 5, further comprising a snap ring that engages the push pin at an annular recess defined around the push pin, the snap ring precluding relative translation of the push pin and the piston.

7. The vent shut-off assembly of claim 6 wherein the window allows access to the annular recess of the push pin during coupling of the snap ring to the push pin.

8. The vent shut-off assembly of claim 7, further comprising:
   a first vapor tube fluidly connected between the first LVD and the main housing; and
   a second vapor tube fluidly connected between the second LVD and the main housing.

9. The vent shut-off assembly of claim 8 wherein the main housing includes a vent line port, wherein the first and second vapor tubes are fluidly coupled to the vent line port.

10. The vent shut-off assembly of claim 1 wherein the main housing includes a canister line port that is fluidly connected to the carbon canister.

11. The vent shut-off assembly of claim 1 wherein the actuator assembly further includes a motor that selectively rotates the cam assembly based on operating conditions.

12. The vent shut-off assembly of claim 1, wherein the cam assembly further includes a second cam that selectively engages a pump causing the pump to pump liquid fuel out of the main housing.

13. The vent shut-off assembly of claim 1 wherein the first cam generally includes a cam surface having a generally high lift surface and a low lift surface.

14. The vent shut-off assembly of claim 13 wherein the poppet valve assembly includes a poppet, a carrier that supports the poppet, a disk that supports a seal member and a pin that selectively engages the first cam.

15. The vent shut-off assembly of claim 14 wherein the poppet valve assembly further comprises:
   a first biasing member biased between the poppet and the carrier;
   a second biasing member biased between the disk and the retainer; and
   a third biasing member biased between the retainer and the collar fixed to the pin.

16. The vent shut-off assembly of claim 15 wherein the vent shut-off assembly operates during normal operation between:

a fully open position wherein the first cam rotates to a position wherein the high lift surface urges the pin to be depressed causing the poppet to be lifted off of sealing engagement with an inner lip seal of the seal member; and a fully closed position wherein the first cam rotates to a position wherein the low lift surface is aligned with the pin wherein the third biasing member urges the pin to retract away from the poppet and attains a sealing engagement with the inner lip seal of the seal member.

17. The vent shut-off assembly of claim 16 wherein the vent shut-off assembly operates during an over pressure relief (OPR) event wherein pressure within the fuel tank is great enough to cause the seal member to be lifted off of a sealed position with the carrier allowing vapor to pass from the fuel tank to the carbon canister.

18. The vent shut-off assembly of claim 17 wherein the vent shut-off assembly operates during an over vacuum relief (OVR) event wherein pressure within the fuel tank has dropped low enough to cause a vacuum wherein the poppet is lifted off of a sealing engagement with the inner lip seal of the seal member allowing vapor to pass into the fuel tank.

19. A vent shut-off assembly configured to manage venting on a fuel tank configured to deliver fuel to an internal combustion engine, the vent shut-off assembly comprising:

a first liquid vapor discriminator LVD disposed in the fuel tank;

a main housing that selectively vents to a carbon canister;

a poppet valve assembly having a poppet valve arranged in the main housing;

a pump that selectively pumps liquid fuel from the main housing, the pump having a check valve that permits liquid fuel to exit the vent shut-off assembly and inhibits liquid fuel from entering the vent shut-off assembly;

an actuator assembly at least partially housed in the main housing, the actuator assembly comprising:

a cam assembly having a cam shaft that includes a first cam and a second cam, wherein:

the first cam actuates a poppet valve; and the second cam that actuates the pump.

20. The vent shut-off assembly of claim 19 wherein the first cam has a profile that one of opens and closes the poppet valve that is fluidly coupled to the first LVD, wherein the poppet valve is in a closed position, vapor is precluded from passing from the fuel tank to the carbon canister and wherein when the poppet valve is in an open position, vapor is permitted from passing from the fuel tank to the carbon canister.

* * * * *